(12) United States Patent
Matsuhara et al.

(10) Patent No.: US 9,866,407 B2
(45) Date of Patent: Jan. 9, 2018

(54) INFORMATION PROCESSING SYSTEM, CLOUD SERVER, DEVICE CONTROL METHOD, AND NON-TRANSITORY COMPUTER-READABLE RECORDING MEDIUM ENCODED WITH DEVICE CONTROL PROGRAM

(71) Applicant: Konica Minolta, Inc., Chiyoda-ku, Tokyo (JP)

(72) Inventors: Kenji Matsuhara, Kawanishi (JP); Hirokazu Kubota, Otsu (JP); Kazuya Anezaki, Itami (JP); Daisuke Sakiyama, Kawanishi (JP); Yuki Asai, Itami (JP); Satoshi Masuda, Neyagawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 225 days.

(21) Appl. No.: 14/954,312

(22) Filed: Nov. 30, 2015

(65) Prior Publication Data
US 2016/0156484 A1    Jun. 2, 2016

(30) Foreign Application Priority Data

Dec. 1, 2014  (JP) ................................ 2014-242933

(51) Int. Cl.
*G06F 15/16* (2006.01)
*H04L 12/46* (2006.01)
*H04L 29/08* (2006.01)

(52) U.S. Cl.
CPC ...... *H04L 12/4633* (2013.01); *H04L 67/1097* (2013.01); *H04L 67/141* (2013.01); *H04L 67/145* (2013.01)

(58) Field of Classification Search
CPC ............. H04L 12/4633; H04L 67/1097; H04L 67/141; H04L 67/145
See application file for complete search history.

(56) References Cited

U.S. PATENT DOCUMENTS

2007/0174436 A1\* 7/2007 Maekawa ........... H04L 12/4633
                                                      709/223
2009/0024634 A1\* 1/2009 Harrang ................ H04L 1/0002
(Continued)

FOREIGN PATENT DOCUMENTS

| JP | 2006-191659 | 7/2006 |
| JP | 2007-096561 | 4/2007 |
| JP | 2011-049841 | 3/2011 |

*Primary Examiner* — Jonathan Bui
(74) *Attorney, Agent, or Firm* — Buchanan Ingersoll & Rooney PC

(57) ABSTRACT

A cloud server acquires a stop period indicating a period during which a management server refrains from providing services; transmits connection requests to said management server if not in the stop period; establishes first communication session when establishment requests including the same address information as address information of connection destination included in the connection request are received from a relay device receiving connection requests forwarded from the management server after transmission of connection requests; transmits jobs to a control target device via first communication session; after first communication session is established, in response to acquisition of result of jobs executed by the control target device, if in the stop period, disconnects first communication session after the stop period finished; and if jobs are generated in the stop period, transmits to the control target device jobs generated in the stop period, via first communication session established before the stop period starts.

19 Claims, 17 Drawing Sheets

(56) References Cited

U.S. PATENT DOCUMENTS

| | | | |
|---|---|---|---|
| 2009/0024749 A1* | 1/2009 | Harrang | H04L 1/0002 709/228 |
| 2009/0225354 A1* | 9/2009 | Yonezawa | H04N 1/00233 358/1.15 |
| 2011/0029664 A1* | 2/2011 | Harrang | H04L 1/0002 709/224 |
| 2014/0201263 A1* | 7/2014 | Ohashi | H04L 29/06047 709/203 |

* cited by examiner

F I G. 1 2
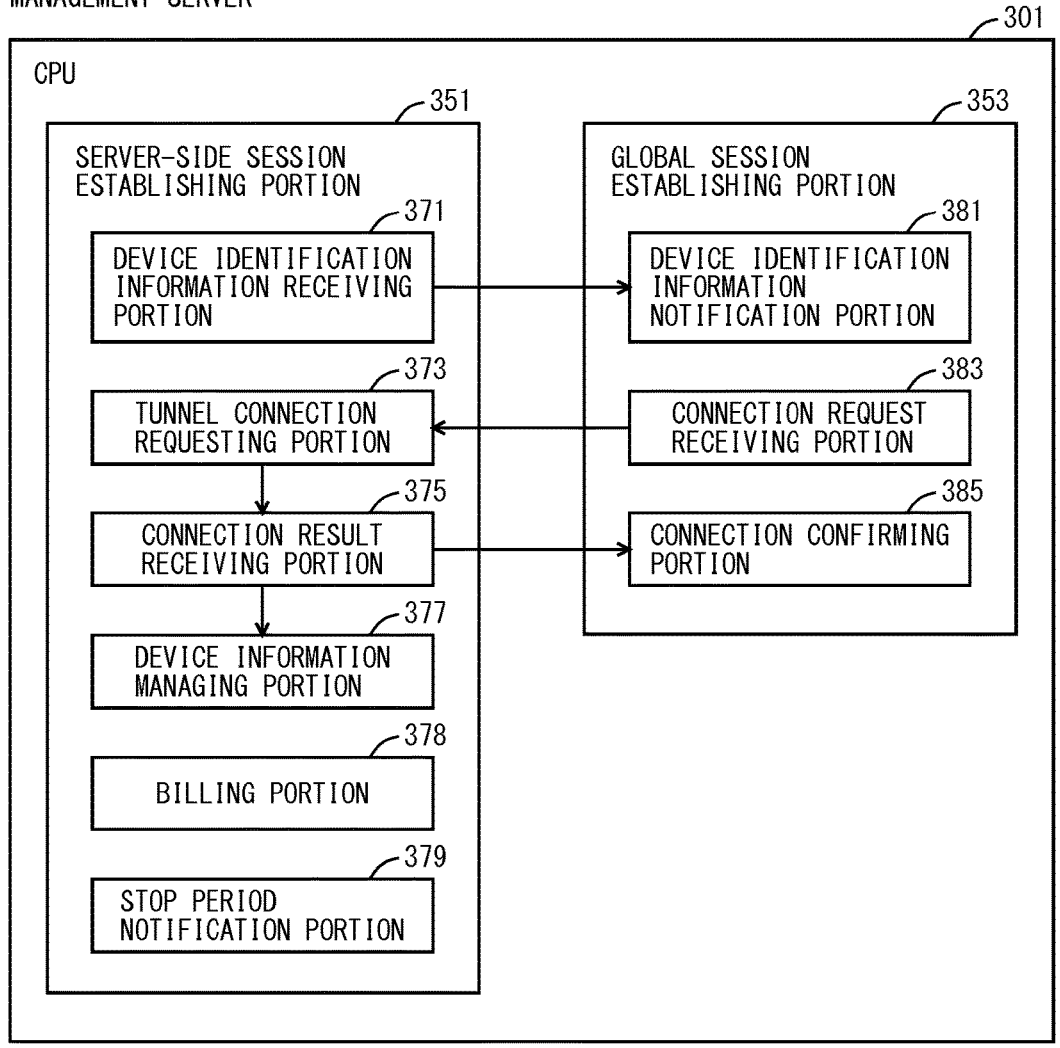

INFORMATION PROCESSING SYSTEM, CLOUD SERVER, DEVICE CONTROL METHOD, AND NON-TRANSITORY COMPUTER-READABLE RECORDING MEDIUM ENCODED WITH DEVICE CONTROL PROGRAM

This application is based on Japanese Patent Application No. 2014-242933 filed with Japan Patent Office on Dec. 1, 2014, the entire content of which is hereby incorporated by reference.

BACKGROUND OF THE INVENTION

Field of the Invention

The present invention relates to an information processing system, a cloud server, a device control method, and a non-transitory computer-readable recording medium encoded with a device control program. More particularly, the present invention relates to an information processing system which allows a cloud server disposed outside a firewall to control a device disposed inside the firewall, a cloud server included in the information processing system, a device control method which is executed in the information processing system, and a non-transitory computer-readable recording medium encoded with a device control program which is executed by the cloud server.

Description of the Related Art

A multi-function peripheral (hereinafter, referred to as "MFP") which is connected to a local area network (LAN) may be controlled by using a service provided from a cloud server which is connected to the Internet. For example, an MFP may be caused to print data stored in a cloud server. However, it is often the case that an MFP is connected to a LAN and the LAN is connected to the Internet via a firewall. Therefore, an access from the cloud server to the MFP may be blocked by the firewall.

Japanese Patent Laid-Open No. 2006-191659 discloses an information system which includes a tunnel management apparatus capable of managing tunnel communication information which is information relating to tunnel communications between a first information processing device and a second information processing device wherein, when the tunnel management apparatus transmits to the first information processing device, on the basis of the tunnel communication information, maintenance information which is information relating to maintenance of tunnel communications, the first information processing device controls, on the basis of the maintenance information accepted from the tunnel management apparatus, tunnel communications with the second information processing device.

However, in a conventional information processing system, since the tunnel management apparatus controls tunnel communications between the first information processing device and the second information processing device, there is a problem that the tunnel management apparatus can not manage tunnel communications in the case where the tunnel management apparatus stops functioning due to maintenance and the like.

SUMMARY OF THE INVENTION

According to an aspect of the present invention, an information processing system includes a cloud server and a management server disposed outside a firewall, and a relay device disposed inside the firewall and connected to a control target device disposed inside the firewall. The cloud server includes a first controller and a first communication portion, wherein the first controller includes a stop period acquiring portion configured to cause the first communication portion to acquire a stop period indicating a period during which the management server refrains from providing a service, a cloud-side session establishing portion configured to cause the first communication portion to establish a first communication session with the relay device, a job generating portion configured to generate a job to be executed by the control target device, and a job transmitting portion configured to cause the first communication portion to transmit said generated job to the control target device via the first communication session. The cloud-side session establishing portion includes a connection requesting portion configured to, in the case of not being in said stop period, transmit to the management server a connection request including address information of a connection destination and address information of a connection source for identifying the control target device, an establishment request receiving portion configured to, after the connection request has been transmitted, establish the first communication session in the case where an establishment request is received from the relay device receiving the connection request forwarded from the management server, the establishment request including the same address information as the address information of the connection destination included in the connection request, and a cloud-side session disconnecting portion configured to, after the first communication session has been established, in response to acquisition of a result of a job executed by the control target device, disconnect the first communication session on the condition of not being in said stop period, and in the case of being in said stop period, disconnect the first communication session after the stop period has finished. The job transmitting portion is configured to, in the case where the job is generated in the stop period, transmit the job generated in the stop period to the control target device, via the first communication session established before the stop period starts.

According to another aspect of the present invention, an information processing system includes a cloud server and a management server disposed outside a firewall, and a relay device disposed inside the firewall and connected to a control target device disposed inside the firewall, the relay device including a first controller, a first communication portion, and a second communication portion. The first controller includes an always-on session establishing portion configured to cause the first communication portion to establish an always-on session with the management server, a stop period acquiring portion configured to cause the first communication portion to acquire stop period indicating a period during which the management server refrains from providing a service, a first session establishing portion configured to, in response to an event that the first communication portion receives from the management server via the always-on session a connection request including address information of a connection source and address information of a connection destination, the connection request being received by the management server from the cloud server, cause the first communication portion to establish a first communication session with the cloud server by using the address information of the connection destination included in the received connection request, a communication history storing portion configured to, in response to the first communication session being established, store in a storing portion a communication history including the address information of the connection source and the address information of the connection destination included in the received connection request, a second session establishing portion configured to cause the second communication portion to establish a second communication session with the control target device specified by the address information of the connection source included in the received connection request, a relay portion configured to, by using the first communication session and the second communication session, relay communications between the cloud server and the control target device, a third session establishing portion configured to, in response to an event that the stop period starts, cause the first communication portion to transmit to the cloud server specified by the address information of the connection destination included in the communication history a re-establishment request including the address information of the connection source included in the communication history, cause the first communication portion to establish a third communication session with the cloud server and maintain the third communication session until said stop period finishes, and a fourth session establishing portion configured to, in response to an event that the stop period starts, cause the second communication portion to establish a fourth communication session with the control target device specified by the address information of the connection source included in the communication history. The relay portion is configured to, during the time that the third communication session is established by the third session establishing portion, relay communications between the cloud server and the control target device by using the third communication session and the fourth communication session. The cloud server includes a second controller, and a third communication portion, wherein the second controller includes a cloud-side session establishing portion configured to cause the third communication portion to establish a first communication session with the relay device, a job generating portion configured to generate a job to be executed by the control target device, and a job transmitting portion configured to cause the third communication portion to transmit the generated job to the control target device via the first communication session. The cloud-side session establishing portion includes a connection requesting portion configured to cause the third communication portion to transmit to the management server a connection request including address information of a connection destination and address information of a connection source for identifying the control target device, an establishment request receiving portion configured to, after the connection request has been transmitted, cause the third communication portion to establish the first communication session in the case where the third communication portion receives an establishment request including the same address information as said address information of the connection destination included in the connection request from the relay device receiving the connection request forwarded from the management server, a cloud-side session disconnecting portion configured to, after the first communication session is established, in response to acquisition of a result of a job executed by the control target device, cause the third communication portion to disconnect the first communication session, and a re-establishing portion configured to, in response to an event that the third communication portion receives the re-establishment request from the relay device, cause the third communication portion to establish the third communication session with the relay device. The job transmitting portion includes a stop period transmitting portion configured to, in the case where the third communication session is established, cause the third communication portion to transmit the generated job to the control target device via the third communication session.

According to a further aspect of the present invention, a cloud server disposed outside a firewall, comprising a controller and a communication portion, wherein the controller includes a stop period acquiring portion configured to cause the communication portion to acquire a stop period indicating a period during which a management server disposed outside the firewall refrains from providing a service, a cloud-side session establishing portion configured to cause the communication portion to establish a first communication session with a relay device disposed inside the firewall and connected to a control target device disposed inside the firewall, a job generating portion configured to generate a job to be executed by the control target device, and a job transmitting portion configured to cause the communication portion to transmit the generated job to the control target device via the first communication session. The cloud-side session establishing portion includes a connection requesting portion configured to, in the case of not being in the stop period, cause the communication portion to transmit to the management server a connection request including address information of a connection destination and address information of a connection source for identifying the control target device, an establishment request receiving portion configured to, after the connection request has been transmitted, cause the communication portion to establish the first communication session in the case where an establishment request is received from the relay device receiving the connection request forwarded from the management server, the establishment request including the same address information as the address information of the connection destination included in the connection request, and a cloud-side session disconnecting portion configured to, after the first communication session has been established, in response to acquisition of a result of a job executed by the control target device, cause the communication portion to disconnect the first communication session on the condition of not being in the stop period, and in the case of being in the stop period, cause the communication portion to disconnect the first communication session after the stop period has finished. The job transmitting portion is configured to, in the case where the job is generated in the stop period, cause the communication portion to transmit to the control target device the job generated in the stop period, via the first communication session established before the stop period starts.

According to a further aspect of the present invention, a device control method performed in an information processing system including a cloud server and a management server disposed outside a firewall and a relay device disposed inside the firewall and connected to a control target device disposed inside the firewall, allowing said relay device to execute an always-on session establishing step of establishing an always-on session with the management server, a stop period acquiring step of acquiring stop period indicating a period during which the management server refrains from providing a service. A first session establishing step of, in response to an event that a connection request including address information of a connection source and address information of a connection destination is received from the management server via the always-on session, the connection request being received by the management server from the cloud server, establishing a first communication session with the cloud server by using the address information of the connection destination included in the received connection request, a communication history storing step of, in response to the first communication session being established, storing a communication history including the address information of the connection source and the address information of the connection destination included in the connection request, a second session establishing step of establishing a second communication session with the control target device specified by the address information of the connection source included in the received connection request, a relay step of, by using the first communication session and the second communication session, relaying communications between the cloud server and the control target device. A third session establishing step of, in response to an event that the stop period starts, transmitting to the cloud server specified by the address information of the connection destination included in the communication history a re-establishment request including the address information of the connection source included in the communication history, establishing a third communication session with the cloud server and maintaining the third communication session until the stop period finishes, and a fourth session establishing step of, in response to an event that the stop period starts, establishing a fourth communication session with the control target device specified by the address information of the connection source included in the communication history. The relay step includes a step of, during the time that the third communication session is established by the third session establishing portion, relaying communications between the cloud server and the control target device by using the third communication session and the fourth communication session, the device control method further allowing the cloud server to execute, a cloud-side session establishing step of establishing a first communication session with the relay device, a job generating step of generating a job to be executed by the control target device, and a job transmitting step of transmitting the generated job to the control target device via the first communication session. The cloud-side session establishing step includes a connection requesting step of transmitting to the management server a connection request including address information of a connection destination and address information of a connection source for identifying the control target device, an establishment request receiving step of, after the connection request has been transmitted, establishing the first communication session in the case where an establishment request including the same address information as the address information of the connection destination included in the connection request is received from the relay device receiving the connection request forwarded from the management server, a cloud-side disconnecting step of, after the first communication session is established, in response to acquisition of a result of a job executed by the control target device, disconnecting the first communication session, and a re-establishing step of, in response to an event that the re-establishment request is received from the relay device, establishing the third communication session with the relay device. The job transmitting step includes a stop period transmitting step of, in the case where the third communication session is established, transmitting the generated job to the control target device via the third communication session.

According to a further aspect of the present invention, a device control method performed by a cloud server disposed outside a firewall, includes: a stop period acquiring step of acquiring stop period indicating a period during which a management server disposed outside the firewall refrains from providing a service; a cloud-side session establishing step of establishing a first communication session with a relay device disposed inside the firewall and connected to a control target device disposed inside the firewall; a job generating step of generating a job to be executed by the control target device; and a job transmitting step of transmitting the generated job to the control target device via the first communication session. The cloud-side session establishing step includes a connection requesting step of, in the case of not being in the stop period, transmitting to the management server a connection request including address information of a connection destination and address information of a connection source for identifying the control target device, an establishment request receiving step of, after the connection request has been transmitted, establishing the first communication session in the case where an establishment request including the same address information as the address information of the connection destination included in the connection request is received from the relay device receiving the connection request forwarded from the management server, and a cloud-side disconnecting step of, after the first communication session has been established, in response to acquisition of a result of a job executed by the control target device, disconnecting the first communication session on the condition of not being in the stop period, and in the case of being in the stop period, disconnecting the first communication session after the stop period has finished. The job transmitting step includes a step of, in the case where the job is generated in the stop period, transmitting the job generated in the stop period to the control target device, via the first communication session established before the stop period starts.

According to a further aspect of the present invention, a non-transitory computer-readable recording medium is encoded with a device control program that allows a computer controlling the cloud server to execute the device control method.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 12 a block diagram showing, by way of example, the functions of a CPU included in the management server according to a modification;

DESCRIPTION OF THE PREFERRED EMBODIMENTS

Figure 1:
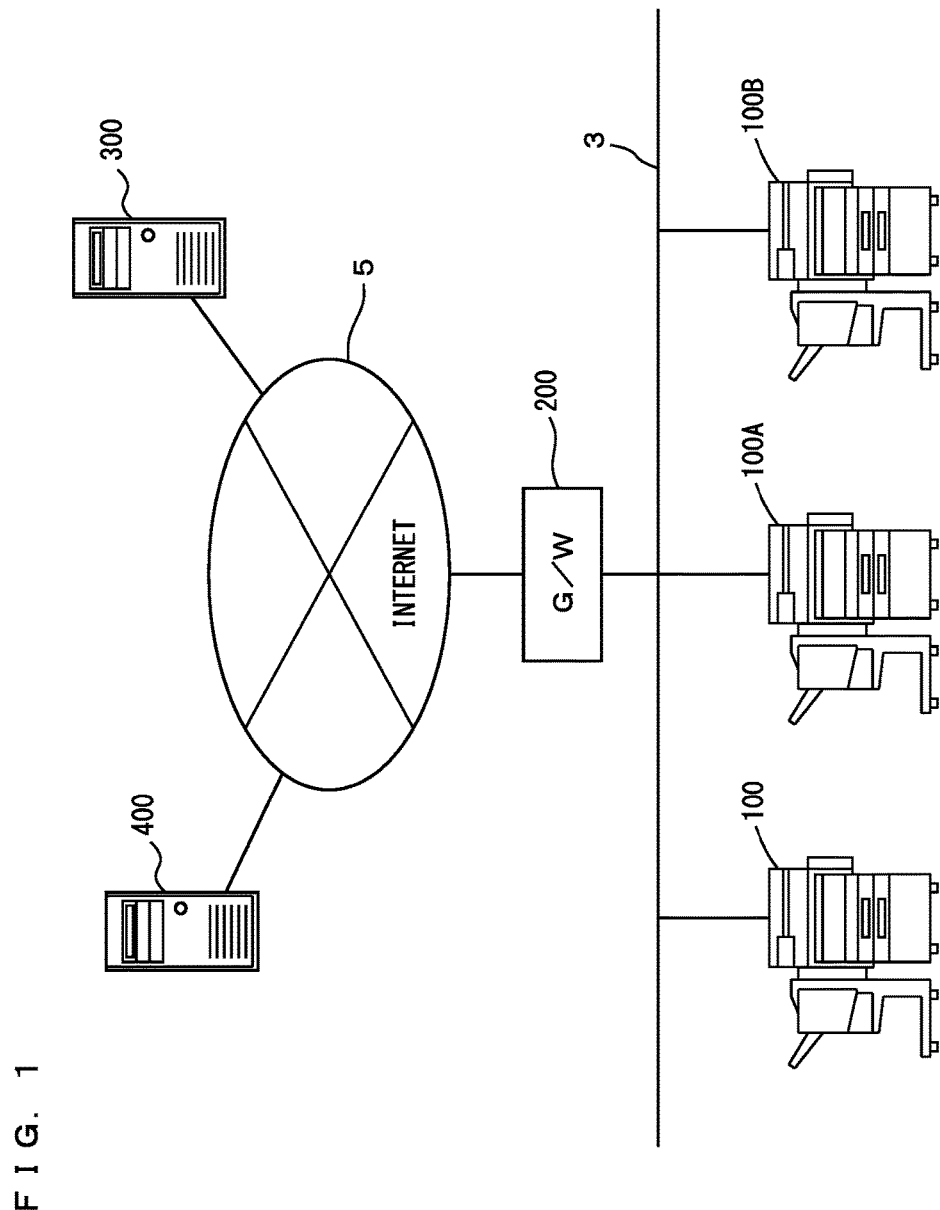
FIG. 1 schematically shows, by way of example, an information processing system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 schematically shows, by way of example, an information processing system according to an embodiment of the present invention. Referring to FIG. 1, an information processing system 1 includes a management server 300, a cloud server 400, a gateway (G/W) device 200 which functions as a relay device, and multi-function peripherals (MFPs) 100, 100A, and 100B. Management server 300, cloud server 400, and gateway device 200 are each connected to Internet 5, and they can communicate with each other via Internet 5. Further, management server 300, cloud server 400, and gateway device 200 each can communicate with another computer which is connected to Internet 5.

Further, gateway device 200 is connected to a local area network (LAN) 3, and MFPs 100, 100A, and 100B are also connected to LAN 3. Gateway device 200 can communicate with MFPs 100, 100A, and 100B connected to LAN 3. Further, gateway device 200 and MFPs 100, 100A, and 100B each can communicate with another computer which is connected to LAN 3.

Gateway device 200 has a firewall function, and connects LAN 3, which is located inside the firewall, with Internet 5, which is located outside the firewall. Gateway device 200 restricts accesses from management server 300 and cloud server 400, which are connected to Internet 5, to MFPs 100, 100A, and 100B, which are connected to LAN 3. The firewall function of gateway device 200 is not limited to a particular type, but it may be a packet filtering firewall function which determines whether to permit a communication or not on the basis of an address included in a packet. Alternatively, it may be an application-layer gateway firewall function which is a proxy that performs and controls a communication with the outside at an application layer protocol level. It should be noted that gateway device 200 is disposed inside the firewall.

In information processing system 1 according to the present embodiment, cloud server 400 which is connected to Internet 5 outside the firewall is able to control any one of MFPs 100, 100A, and 100 B connected to LAN 3 inside the firewall. There is a case where cloud server 400 is accessed from a personal computer (hereinafter, referred to as a "PC") which is connected to LAN 3 inside the firewall, and executes a process for providing a service in accordance with an instruction by a user who operates the PC. In addition, there is another case where cloud server 400 is accessed from the PC which is connected to LAN 5 outside the firewall, and executes the process for providing a service in accordance with an instruction by the user who operates the PC. It is here assumed, by way of example, that cloud server 400 executes a process on the basis of a service provided thereby, and causes MFP 100 to execute a process on the resultant data. In this case, cloud server 400 transmits to MFP 100 a control command for causing MFP 100 to execute the process.

In order to allow the control command transmitted to MFP 100 by cloud server 400 to pass through the firewall of gateway device 200, gateway device 200 establishes a tunnel connection between cloud server 400 and MFP 100. While there are a variety of techniques and methods for establishing a the tunnel connection, it is here assumed, by way of example, that management server 300 supports the tunnel connection.

Gateway device 200 uses a previously-stored network address of management server 300 to request an establishment of a communication session with management server 300. Gateway device 200 is disposed inside the firewall, and management server 300 is disposed outside the firewall, and therefore, the communication session to pass through the firewall is established. This communication session is hereinafter called an "always-on session".

When gateway device 200 establishes the always-on session with management server 300, gateway device 200 transmits to management server 300 device identification information for identifying each of MFPs 100, 100A, and 100B, via the always-on session. Management server 300 recognizes MFPs 100, 100A, and 100B connected to gateway device 200.

Next, cloud server 400 establishes a communication session with management server 300. Hereinafter, the communication session established between cloud server 400 and management server 300 is called "a global session". Management server 300 receives from gateway device 200 the device identification information of each of MFPs 100, 100A, and 100 B, and allows the user who operates cloud server 400 to select any one of MFPs 100, 100A, and 100B, as a device available for the tunnel connection. It is here assumed, by way of example, that MFP 100 is selected by the user who operates cloud server 400, as the device available for the tunnel connection.

In the case where MFP 100 is selected by the user who operates cloud server 400, as the device available for the tunnel connection, cloud server 400 transmits to management server 300 a connection request including address information of MFP 100 and address information of cloud server 400. The address information of MFP 100 includes device identification information of gateway device 200 and device identification information of MFP 100. The address information of cloud server 400 includes a network address of cloud server 400 and a job ID of a job executed by cloud server 400. It is here assumed that the address information of cloud server 400 is a URL (Uniform Resource Locator) for accessing from MFP 100 to cloud server 400. In a URL, for example as in "https://www.example.com/print_service?job_id=j00123:60001", a network address (domain name) of cloud server 400, a Web page identifier, an identifier (job ID) of the job executed by cloud server 400, and a listening port number are included. As the listening port, an unused one of the ports within a prescribed range is used. Further, a unique ID is issued as the job ID. The job executed by cloud server 400 is a job which corresponds to a service that the user who is operating cloud server 400 has designated from among the services provided by cloud server 400. Since the URL as the address information of cloud server 400 includes the job ID, it is possible to associate a device that has accessed the URL with a job that is specified by the job ID. In other words, it is possible to associate the job that executes the service designated by the user who is operating cloud server 400, with the device that requested a connection, which is MFP 100 here.

In the case where the connection request is received from cloud server 400, management server 300 specifies gateway device 200 on the basis of the device identification information of gateway device 200 included in the address information of MFP 100 included in the connection request, and transmits the connection request to gateway device 200 via the always-on session. In this case, the connection request is capsulated for transmission in accordance with a protocol corresponding to the always-on session.

Further, in response to an even that the connection request is received from management server 300, gateway device 200 establishes a communication session with cloud server 400 on the basis of the address information of cloud server 400 included in the connection request. The communication session established here between gateway device 200 and cloud server 400 is called "a first communication session". The tunnel connection to pass through the firewall is thus established.

In response to an event that the connection request is received from management server 300, gateway device 200 specifies MFP 100 on the basis of the device identification information included in the address information of MFP 100 included in the connection request, and establishes a communication session with MFP 100. The communication session established here between gateway device 200 and MFP 100 is called "a second communication session".

Gateway device 200 relays communications between cloud server 400 and MFP 100 by using the first communication session established with cloud server 400 and the second communication session established with MFP 100. For example, gateway device 200 relays, by connecting the first communication session with the second communication session, communications between cloud server 400 and MFP 100.

It is noted here that a method for establishing the tunnel connection is not limited to the above-described method; another method may be used as well.

The service provided by cloud server 400 includes, for example, a program management service for cloud server 400 to manage a version of a program of MFP 100 and execute update on the basis of the version-up, a service for cloud server 400 to function as a file server, and a service for executing an image process on image data. The image process is not limited to a particular type, but it may be, for example, a process of execution of sharpening and smoothing image data in which a photograph is represented, a process of character recognition of image data in which a character is represented, and a process of translating a language into another language.

MFPs 100, 100A, and 100B have the same hardware configurations and functions, and therefore, unless otherwise specified, MFP 100 will be described representatively.

Figure 2:
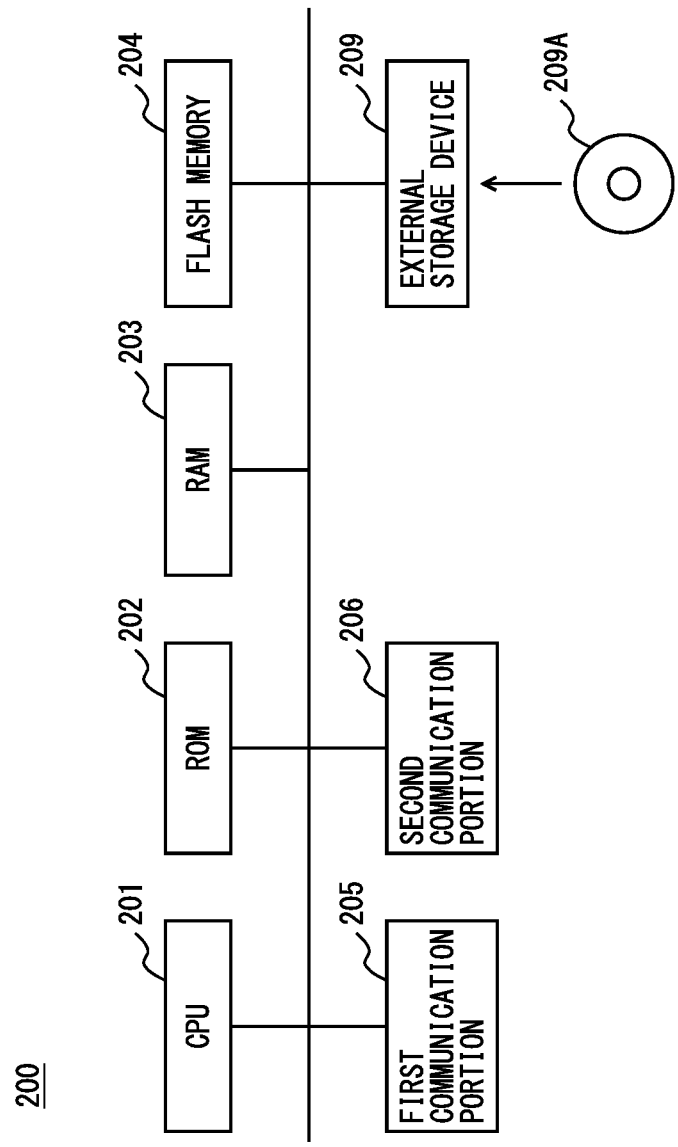
FIG. 2 is a block diagram schematically showing an exemplary hardware configuration of a gateway device.

FIG. 2 is a block diagram schematically showing an exemplary hardware configuration of the gateway device. Referring to FIG. 2, gateway device 200 according to the present embodiment includes: a central processing unit (CPU) 201 which is responsible for overall control of gateway device 200; a read only memory (ROM) 202 for storing, among others, a program to be executed by CPU 201; a random access memory (RAM) 203 used as a work area for CPU 201; a flash memory 204 which stores data in a non-volatile manner; a first communication portion 205; a second communication portion 206; and an external storage device 209.

First communication portion 205 is a communication interface (I/F) for connecting gateway device 200 to Internet 5. Second communication portion 206 is a communication interface (I/F) for connecting gateway device 200 to LAN 3.

Flash memory 204 stores a program executed by CPU 201 or data necessary for execution of the program. CPU 201 loads the program stored in flash memory 204, into RAM 203 for execution. External storage device 209 is detachably attached to gateway device 200, and it can be mounted with a compact disc CD-ROM 209A in which a program is stored. CPU 201 is capable of accessing CD-ROM 209A via external storage device 209. CPU 201 can load a relay program, which is stored in CD-ROM 209A mounted on external storage device 209, into RAM 203 for execution.

While the program stored in flash memory 204 or CD-ROM 209A has been described as the program executed by CPU 201, another computer connected to Internet 5 may rewrite the program stored in flash memory 204, or may additionally write a new program therein. Further, gateway device 200 may download a program from another computer connected to Internet 5. As used herein, the "program" includes, not only the program which CPU 201 can execute directly, but also a source program, a compressed program, an encrypted program, and others.

It is noted that the medium for storing the program executed by CPU 201 is not restricted to CD-ROM 209A. It may be an optical disc (a magneto-optical (MO) disc, a mini disc (MD), or a digital versatile disc (DVD)), an IC card, an optical card, or a semiconductor memory such as a mask ROM, an erasable programmable ROM (EPROM), an electrically erasable and programmable ROM (EEPROM), or the like.

Figure 3:
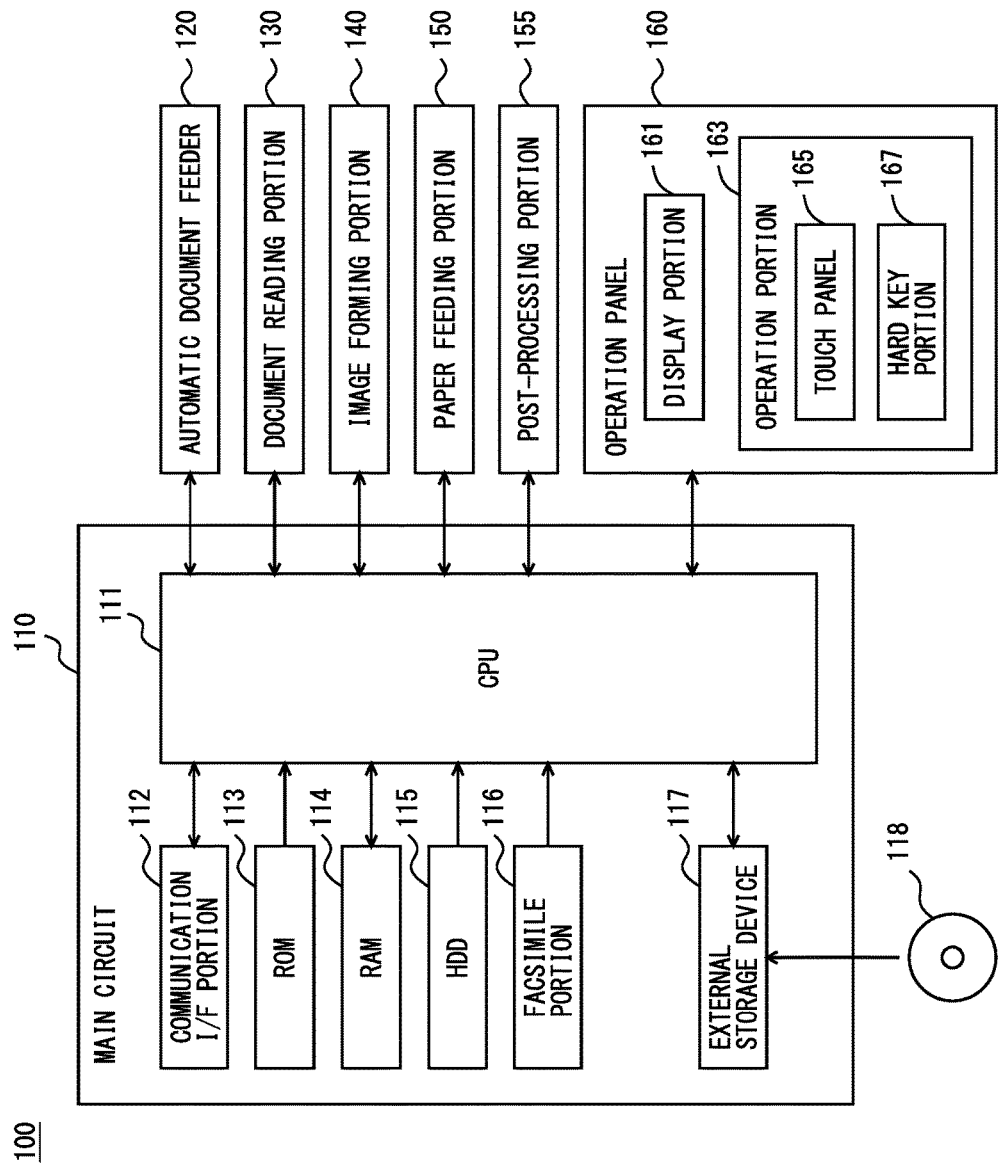
FIG. 3 is a block diagram schematically showing an exemplary hardware configuration of an MFP.

FIG. 3 is a block diagram schematically showing an exemplary hardware configuration of the MFP. Referring to FIG. 3, MFP 100 includes: a main circuit 110; a document reading portion 130 which reads a document; an automatic document feeder 120 which feeds a document to document reading portion 130; an image forming portion 140 which forms an image on a sheet of paper or the like on the basis of image data output from document reading portion 130 that has read a document; a paper feeding portion 150 which supplies sheets of paper to image forming portion 140; a post-processing portion 155 which processes sheets of paper on which images have been formed; and an operation panel 160 serving as a user interface.

Post-processing portion 155 executes a sorting process of sorting and discharging one or more sheets of paper on which images have been formed by image forming portion 140, a hole-punching process of punching the sheets, and a stapling process of stapling the sheets.

Main circuit 110 includes a CPU 111, a communication interface (I/F) portion 112, a ROM 113, a RAM 114, a hard disk drive (HDD) 115 as a mass storage, a facsimile portion 116, and an external storage device 117 on which a CD-ROM 118 is mounted. CPU 111 is connected with automatic document feeder 120, document reading portion 130, image forming portion 140, paper feeding portion 150, post-processing portion 155 and operation panel 160, and is responsible for overall control of MFP 100.

ROM 113 stores a program executed by CPU 111 or data necessary for execution of the program. RAM 114 is used as a work area when CPU 111 executes a program. Further, RAM 114 temporarily stores read data (image data) continuously transmitted from document reading portion 130.

Operation panel 160, which is provided on an upper surface of MFP 100, includes a display portion 161 and an operation portion 163. Display portion 161 is a display such as a liquid crystal display (LCD) or an organic electroluminescence display (ELD), and displays an instruction menu for the user, information about acquired image data, and others. Operation portion 163 includes a hard key portion 167 having a plurality of keys, and accepts input data, such as instructions, characters, and numerical characters, according to the key operations by the user. Operation portion 163 further includes a touch panel 165 disposed on display portion 161.

Communication I/F portion 112 is an interface for connecting MFP 100 to LAN 3. CPU 111 communicates with a device which is connected to LAN 3, via communication I/F portion 112 for data transmission/reception. Further, communication I/F portion 112 is able to communicate with a computer connected to the Internet, such as management server 300 and cloud server 400, through gateway device 200.

Facsimile portion 116 is connected to public switched telephone networks (PSTN), and transmits facsimile data to or receives facsimile data from the PSTN. Facsimile portion 116 stores the received facsimile data into HDD 115, or outputs the data to image forming portion 140. Image forming portion 140 prints on a sheet of paper the facsimile data received by facsimile portion 116. Further, facsimile portion 116 converts the data stored in HDD 115 to facsimile data, and transmits the facsimile data to a facsimile machine connected to the PSTN.

External storage device 117 is mounted with CD-ROM (compact Disk ROM) 118. CPU 111 is capable of accessing CD-ROM 118 via external storage device 117. CPU 111 loads the program stored in CD-ROM 118 which is mounted on external storage device 117, into RAM 114 for execution. It is noted that the medium for storing the program executed by CPU 111 is not restricted to CD-ROM 118. It may be an optical disc (an MO disc, an MD, or a DVD), an IC card, an optical card, or a semiconductor memory such as a mask ROM, an EPROM, an EEPROM, or the like.

Further, CPU 111 may load a program stored in HDD 115, into RAM 114 for execution. In this case, another computer connected to LAN 3 or Internet 5 may rewrite the program stored in HDD 115 of MFP 100, or may additionally write a new program therein. Further, MFP 100 may download a program from another computer connected to LAN 3 or Internet 5, and store the program in HDD 115. As used herein, the "program" includes, not only the program which CPU 111 can execute directly, but also a source program, a compressed program, an encrypted program, and others.

Figure 4:
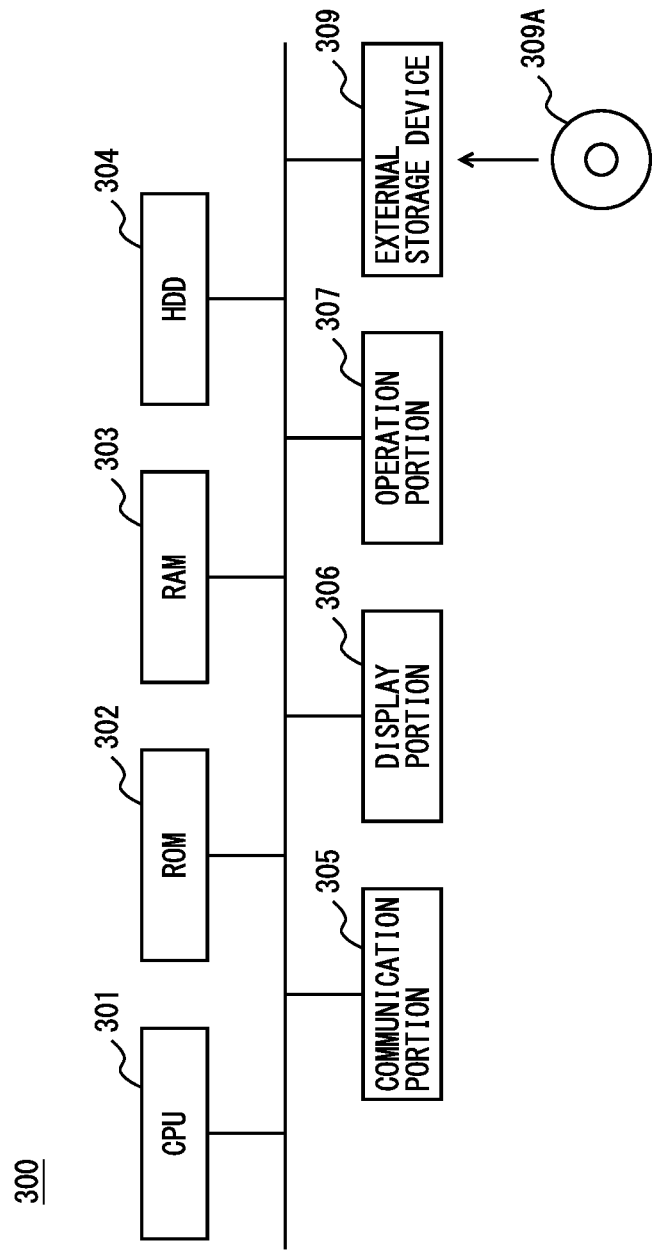
FIG. 4 is a block diagram schematically showing an exemplary hardware configuration of a management server according to the present embodiment.

FIG. 4 is a block diagram schematically showing an exemplary hardware configuration of the management server according to the present embodiment. Referring to FIG. 4, management server 300 includes: a CPU 301 which is responsible for overall control of management server 300; a ROM 302 for storing, among others, a program to be executed by CPU 301; a RAM 303 used as a work area for CPU 301; a HDD 304 which stores data in a non-volatile manner; a communication portion 305 which connects CPU 301 to Internet 5; a display portion 306 which displays information; an operation portion 307 which accepts operations by the user; and an external storage device 309.

External storage device 309 is mounted with a CD-ROM 309A. CPU 301 is capable of accessing CD-ROM 309A through external storage device 309. CPU 301 loads a program stored in CD-ROM 309A which is mounted on external storage device 309, into RAM 303 for execution. It is noted that the medium for storing the program executed by CPU 301 is not restricted to CD-ROM 309A. It may be an optical disc, an IC card, an optical card, or a semiconductor memory such as a mask ROM, an EPROM, an EEPROM, or the like.

Further, the program executed by CPU 301 is not restricted to the program stored in CD-ROM 309A; a program stored in HDD 304 may be loaded into RAM 303 for execution. In this case, another computer connected to Internet 5 may rewrite the program stored in HDD 304 of management server 300, or may additionally write a new program therein. Further, management server 300 may download a program from another computer connected to Internet 5, and store the program in HDD 304. As used herein, the "program" includes, not only the program which CPU 301 can execute directly, but also a source program, a compressed program, an encrypted program, and others.

Figure 5:
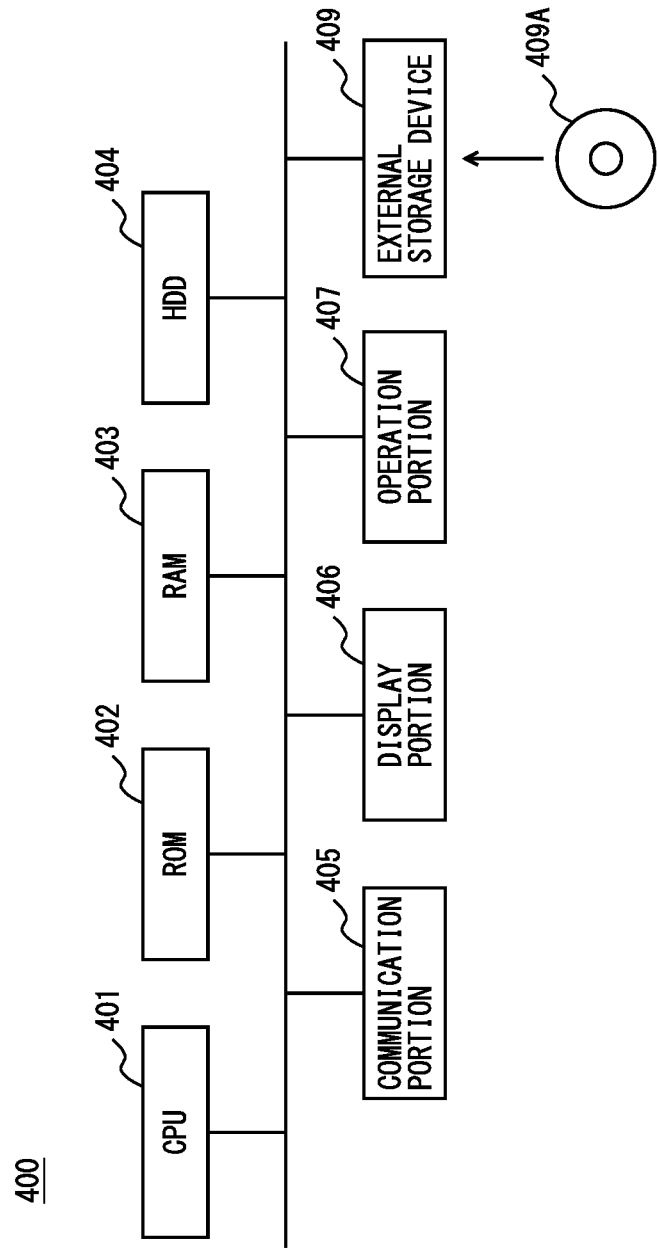
FIG. 5 is a block diagram schematically showing an exemplary hardware configuration of a cloud server according to the present embodiment.

FIG. 5 is a block diagram schematically showing an exemplary hardware configuration of the cloud server according to the present embodiment. Referring to FIG. 5, cloud server 400 includes: a CPU 401 which is responsible for overall control of cloud server 400; a ROM 402 for storing, among others, a program to be executed by CPU 401; a RAM 403 used as a work area for CPU 401; a HDD 404 which stores data in a non-volatile manner; a communication portion 405 which connects CPU 401 to Internet 5; a display portion 406 which displays information; an operation portion 407 which accepts operations by the user; and an external storage device 409.

External storage device 409 is mounted with a CD-ROM 409A. CPU 401 is capable of accessing CD-ROM 409A through external storage device 409. CPU 401 loads a program stored in CD-ROM 409A which is mounted on external storage device 409, into RAM 403 for execution. It is noted that the medium for storing the program executed by CPU 401 is not restricted to CD-ROM 409A. It may be an optical disc, an IC card, an optical card, or a semiconductor memory such as a mask ROM, an EPROM, an EEPROM, or the like.

Further, the program executed by CPU 401 is not restricted to the program stored in CD-ROM 409A; a program stored in HDD 404 may be loaded into RAM 403 for execution. In this case, another computer connected to Internet 5 may rewrite the program stored in HDD 404 of cloud server 400, or may additionally write a new program therein. Further, cloud server 400 may download a program from another computer connected to Internet 5, and store the program in HDD 404. As used herein, the "program" includes, not only the program which CPU 401 can execute directly, but also a source program, a compressed program, an encrypted program, and others.

Figure 6:
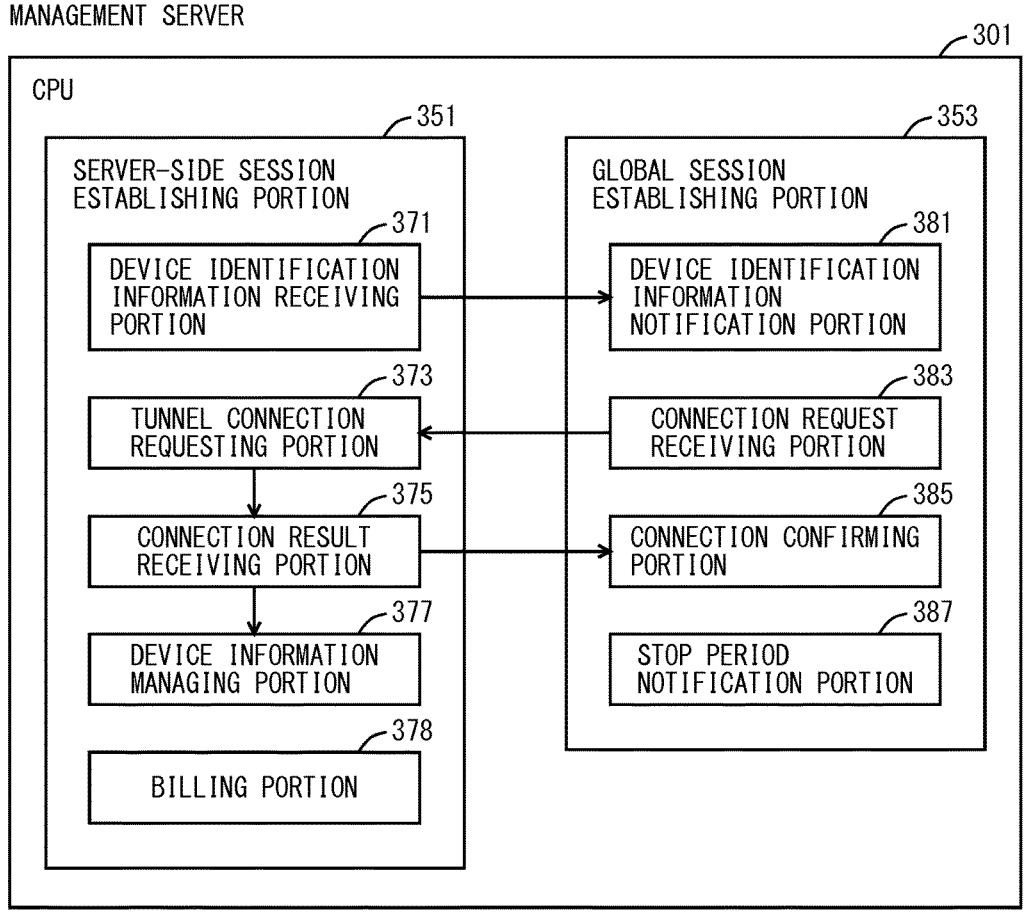
FIG. 6 a block diagram showing, by way of example, the functions of a CPU included in the management server.

FIG. 6 a block diagram schematically showing an exemplary hardware configuration of the management server according to the present embodiment. The functions shown in FIG. 6 are formed in CPU 301 included in management server 300 as CPU 301 executes a program stored in ROM 302, HDD 304, or CD-ROM 309A. Referring to FIG. 6, CPU 301 included in management server 300 includes a server-side session establishing portion 351, and a global session establishing portion 353.

Server-side session establishing portion 351 controls communication portion 305 to establish a communication session with gateway device 200. The communication session established here is an always-on session. Server-side session establishing portion 351 establishes the communication session in response to an event that an establishment request of the communication session is received from gateway device 200. Server-side session establishing portion 351 includes: a device identification information receiving portion 371; a tunnel connection requesting portion 373; a connection result receiving portion 375; a device information managing portion 377; and a billing portion 378.

Device identification information receiving portion 371 receives the device identification information of each of MFPs 100, 100A, and 100B via the always-on session established with gateway device 200, and outputs to global session establishing portion 353 the received device identification information and the device identification information of gateway device 200. The functions of gateway device 200 will be described in detail later, but gateway device 200 transmits, in response to an event that the always-on session is established with management server 300, the device identification information corresponding to each of the devices connected to LAN 3, which will be each of MFPs 100, 100A, and 100B here. The device identification information of each of MFPs 100, 100A, and 100B is not limited, but may be a local Internet Protocol (IP) address assigned to each of MFPs 100, 100A, and 100B in LAN 3. The device identification information of gateway device 200 is not limited, but may be a global IP address assigned to gateway device 200 in Internet 5.

Global session establishing portion 353 controls communication portion 305 to establish a communication session with a computer located outside the firewall. It is here assumed, by way of example, that a communication session is established with cloud server 400. The communication session established here is a global session. Global session establishing portion 353 controls communication portion 305, and in response to an event that an establishment request is received from cloud server 400, global session establishing portion 353 establishes a global session with cloud server 400. Global session establishing portion 353 includes a device identification information notification portion 381, a connection request receiving portion 383, a connection confirming portion 385, and a stop period notification portion 387.

Device identification information notification portion 381 receives from device identification information receiving portion 371 the device identification information of gateway device 200 and the device identification information of each of MFPs 100, 100A, and 100B. Device identification information notification portion 381 transmits to cloud server 400 the device identification information of gateway device 200 and the device identification information of each of MFPs 100, 100A, and 100B, via the global session.

Connection request receiving portion 383 receives the connection request transmitted from cloud server 400 via the global session, and outputs the received connection request to server-side session establishing portion 351.

The connection request includes the address information of MFP 100, and the address information of cloud server 400. The address information of MFP 100 includes the device identification information of gateway device 200 and the device identification information of MFP 100. The address information of cloud server 400 is a URL for accessing cloud server 400 from MFP 100. The URL includes an address (domain name) of cloud server 400, a Web page identifier, an identifier (job ID) of the job executed by cloud server 400, and a listening port number.

Tunnel connection requesting portion 373 transmits, in response to an event that the connection request is input from connection request receiving portion 383, a tunnel connection request to gateway device 200 via the always-on session. The tunnel connection request is transmitted as a packet in which the connection request is capsulated for transmission in accordance with the protocol corresponding to the always-on session. Gateway device 200 receiving the tunnel connection request establishes a communication session with MFP 100, and returns a tunnel connection result indicating a result thereof.

Connection result receiving portion 375 receives the tunnel connection result transmitted by gateway device 200, via the always-on session. The tunnel connection result includes the address information of MFP 100, and either information indicating success of the tunnel connection or information indicating failure of the tunnel connection. The case where the tunnel connection fails, for example, may be the case where the power of MFP 100 is not turned on, or the case where MFP 100 is in trouble of being unable to communicate, and the like. Connection result receiving portion 375 outputs the tunnel connection result to global session establishing portion 353 and device information managing portion 377.

Device information managing portion 377 stores in HDD 304 device state information of each of MFPs 100, 100A, and 100B. The device state information is data which associates the address information of each of MFPs 100, 100A, and 100B with a connection availability indicating either success or failure of the tunnel connection. Device information managing portion 377 updates, in response to an event that the tunnel connection result is input from connection result receiving portion 375, the device state information stored in HDD 304. If the tunnel connection result includes the information indicating success of the tunnel connection, device information managing portion 377 updates, with the information indicating success of the tunnel connection, the connection availability of the device state information including the same address information as the address information included in the tunnel connection result, among the device state information stored in HDD 304, to thereby update the device state information. Further, if the tunnel connection result includes the information indicating failure of the tunnel connection, device information managing portion 377 updates, with the information indicating failure of the tunnel connection, the connection availability of the device state information including the same address information as the address information included in the tunnel connection result, among the device state information stored in HDD 304.

Billing portion 378 receives performance information transmitted by gateway device 200, via the always-on session. The performance information includes the address information of any one of MFPs 100, 100A, and 100B, process identification information of a process executed by the device, and a process volume. In response to an event that the performance information is received, billing portion 378 generates billing information on the basis of the performance information, and stores the generated billing information in HDD 304. The billing information includes the address information of any one of MFPs 100, 100A, and 100B, and a charge for a process executed by the device. It is here assumed, by way of example, that MFP 100 executes a printing process. It will be described as an example of this case that a unit price for a sheet of paper for MFP 100 to execute the printing process is determined, and the performance information includes the address information of MFP 100, the process identification information of the printing process, and the number of printed copies as the process volume. Billing portion 378 calculates a charge by multiplying by the unit price the number of printed copies included in the performance information, and generates the billing information including the address information of MFP 100 and the calculated charge, to store in HDD 304.

In the case where the tunnel connection result input from connection result receiving portion 375 includes the information indicating success of the tunnel connection, connection confirming portion 385 of global session establishing portion 353 transmits to cloud server 400, via the global session, a signal indicating success of the connection. Cloud server 400 is able to notify the user who operates cloud server 400 of success of the connection by displaying, for example, a message indicating success of the connection. In the case where the tunnel connection result input from connection result receiving portion 375 includes the information indicating failure of the tunnel connection, connection confirming portion 385 transmits to cloud server 400, via the global session, an error signal indicating failure of the connection. Cloud server 400 is able to notify the user who operates cloud server 400 of failure of the connection by displaying, for example, a message indicating failure of the connection.

Stop period notification portion 387 notifies cloud server 400 of a stop period during which management server 300 refrains from providing a service. The period during which management server 300 refrains from providing a service is, for example, a period during which management server 300 performs a version-up of a program, a period during which management server 300 is maintained, namely, the period during which management server does not function. Stop period notification portion 387 may, at a stage where the global session is established with cloud server 400 by global session establishing portion 353, transmit a notification of the stop period to cloud server 400, or transmit a notification of the stop period to cloud server 400 at an arbitrary timing.

Figure 7:
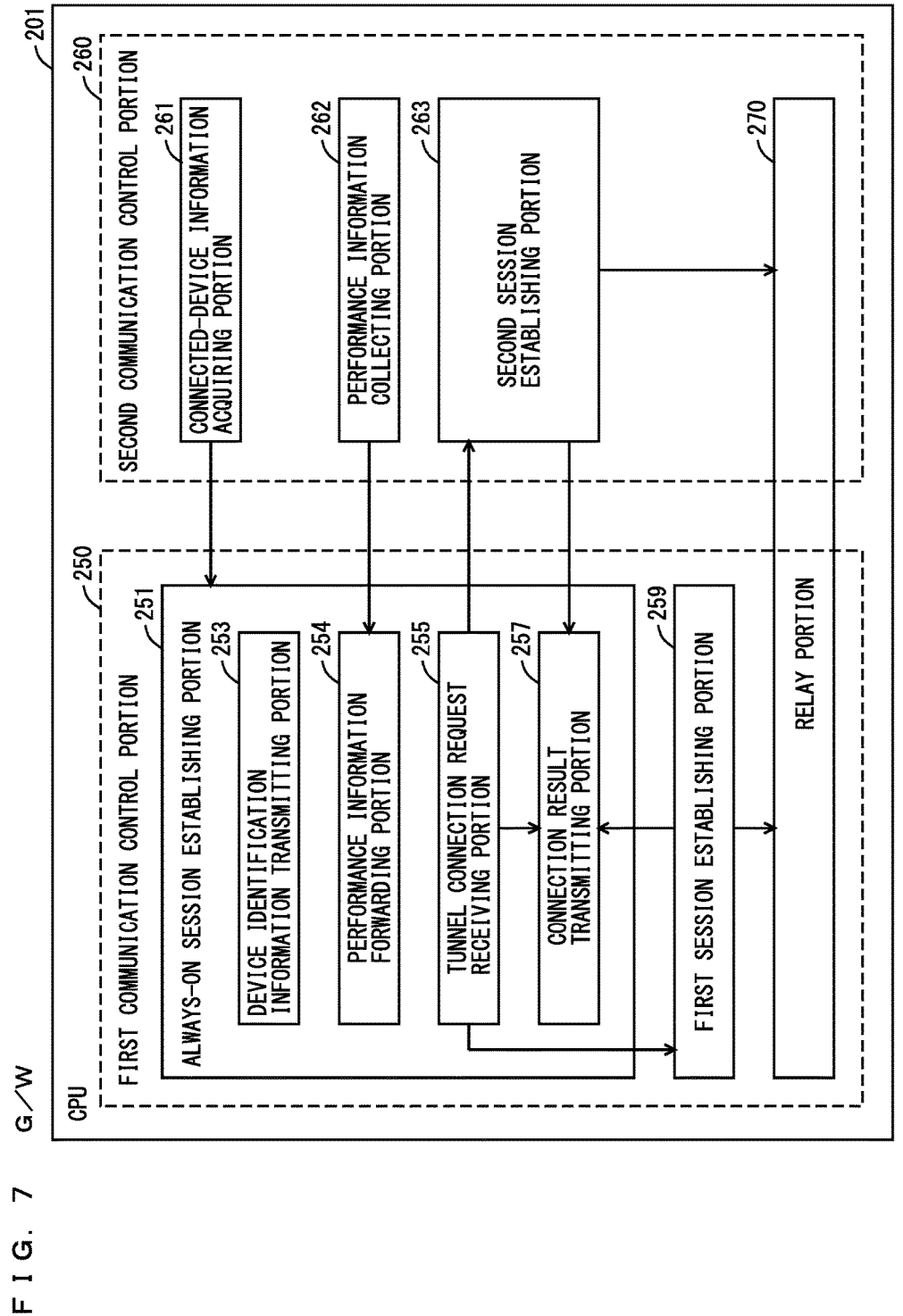
FIG. 7 is a block diagram showing, by way of example, the functions of a CPU included in the gateway device.

FIG. 7 is a block diagram showing, by way of example, the functions of a CPU included in the gateway device. The functions shown in FIG. 7 are formed in CPU 201 included in gateway device 200 as CPU 201 executes a relay program stored in ROM 202, flash memory 204, or CD-ROM 209A. Referring to FIG. 7, CPU 201 included in gateway device 200 includes: a connected-device information acquiring portion 261; a performance information collecting portion 262, an always-on session establishing portion 251, a first session establishing portion 259, a second session establishing portion 263 and a relay portion 270.

CPU 201 further includes a first communication control portion 250 and a second communication control portion 260. First communication control portion 250 controls first communication portion 205 so as to control a communication with a computer connected to Internet 5. First communication control portion 250 includes always-on session establishing portion 251, first session establishing portion 259, and part of relay portion 270.

Second communication control portion 260 controls second communication portion 206 so as to control a communication with each of MFPs 100, 100A, and 100B connected to LAN 3. Second communication control portion 260 includes connected-device information acquiring portion 261, performance information collecting portion 262, second session establishing portion 263 and part of relay portion 270.

Connected-device information acquiring portion 261 acquires the device identification information of a device connected to LAN 3 inside the firewall. Connected-device information acquiring portion 261 searches a device connected to LAN 3 at a prescribed timing, and acquires the device identification information of the detected device. The prescribed timing may be determined arbitrarily; it may be, for example, the time when gateway device 200 is turned on, or a predetermined time. It is here assumed, by way of example, that MFPs 100, 100A, and 100B are detected as the devices connected to LAN 3. Connected-device information acquiring portion 261 controls second communication portion 206 so as to acquire the device identification information of each of MFPs 100, 100A, and 100B as the devices connected to LAN 3. The device identification information of each of MFPs 100, 100A, and 100B is a local IP address, for example. Connected-device information acquiring portion 261 outputs the detected device identification information to always-on session establishing portion 251.

Performance information collecting portion 262 acquires the performance information of a device connected to LAN 3 inside the firewall. The performance information includes the device identification information of any one of MFPs 100, 100A, and 100B, the process identification information of a process executed by the device, and a process volume. In the case where the performance information transmitted from each of MFPs 100, 100A, and 100B detected as the device connected to LAN 3 is received, performance information collecting portion 262 controls second communication portion 206 so as to return a reception confirmation to the device which has transmitted the performance information, while outputting the received performance information to always-on session establishing portion 251. In other words, performance information collecting portion 262 receives the performance information from each of MFPs 100, 100A, and 100B on behalf of management server 300.

Always-on session establishing portion 251 receives the device identification information of each of MFPs 100, 100A, and 100B from connected-device information acquiring portion 261. Always-on session establishing portion 251 controls first communication portion 205 so as to transmit the establishment request of a communication session to management server 300, and establish a communication session with management server 300. The communication session established here is an always-on session which is connected constantly. The always-on session is not particularly limited, but it may be, for example, a message session based on extensible messaging and presence protocol (XMPP). Since a global IP address of management server 300 is stored in flash memory 204 in advance, always-on session establishing portion 251 uses the global IP address stored in flash memory 204 so as to transmit the establishment request of a communication session to management server 300, and perform prescribed negotiations with management server 300, to thereby establish the always-on session. In the case where management server 300 stops providing a service, the always-on session is disconnected. After the always-on session is disconnected, always-on session establishing portion 251 transmits the establishment request of a communication session to management server 300 at prescribed time intervals until the communication session is established with management server 300, to thereby attempt an establishment of the always-on session.

Always-on session establishing portion 251 includes a device identification information transmitting portion 253, a performance information forwarding portion 254, a tunnel connection request receiving portion 255, and connection result transmitting portion 257. Device identification information transmitting portion 253 transmits to management server 300 via the always-on session, in order to notify management server 300 of a device connected to LAN 3 inside the firewall, the device identification information of each of MFPs 100, 100A, and 100B input from connected-device information acquiring portion 261.

Performance information forwarding portion 254 receives the performance information from performance information collecting portion 262. Performance information forwarding portion 254 transmits, in response to an event that the performance information is input from performance information collecting portion 262, the performance information to management server 300 via the always-on session. In the case where the always-on session is not established, performance information forwarding portion 254 temporarily stores in RAM 203 the performance information input from performance information collecting portion 262 until the always-on session is next established. In response to an event that the always-on session is next established, performance information forwarding portion 254 transmits the performance information temporarily stored in RAM 203 to management server via the always-on session.

Tunnel connection request receiving portion 255 receives the tunnel connection request from management server 300 via the always-on session. The tunnel connection request includes the connection request received by management server 300 from cloud server 400. The connection request includes the address information of a connection source, and the address information of a connection destination. It is here assumed, by way of example, that the address information of a connection source is the address information of MFP 100, and the address information of a connection destination is the address information of cloud server 400. The address information of MFP 100 includes the device identification information of gateway device 200 and the device identification information of MFP 100. The address information of cloud server 400 is a URL for accessing cloud server 400 from MFP 100.

In response to reception of the tunnel connection request, tunnel connection request receiving portion 255 outputs to first session establishing portion 259 the connection identification information for identifying the tunnel connection request and the address information of a connection destination included in the tunnel connection request, outputs to second session establishing portion 263 the connection identification information for identifying the tunnel connection request and the address information of a connection source, and outputs to connection result transmitting portion 257 a transmission instruction of a connection result.

In response to an event that the connection identification information and the address information of a connection destination are input from tunnel connection request receiving portion 255, first session establishing portion 259 controls first communication portion 205 so as to transmit the establishment request by using the address information of a connection destination. Here, since the address information of a connection destination is the address information of cloud server 400, first session establishing portion 259 transmits the establishment request to cloud server 400, and establishes a communication session with cloud server 400. Specifically, the establishment request is a GET command including a URL of the address information of cloud server 400 input from tunnel connection request receiving portion 255. First session establishing portion 259 transmits the GET command including the URL of the address information of cloud server 400, to thereby a communication session with cloud server 400 specified by the URL through an HTTP tunnel. The communication session established here is a first communication session. In response to an event that the first communication session is established, first session establishing portion 259 outputs to relay portion 270 and connection result transmitting portion 257 the session identification information and the connection identification information for identifying the first communication session.

In response to an event that the connection identification information and the address information of a connection source are input from tunnel connection request receiving portion 255, second session establishing portion 263 controls second communication portion 206 so as to transmit the establishment request by using the address information of a connection source. Here, since the address information of a connection source is the address information of MFP 100, second session establishing portion 263 transmits the establishment request to MFP 100, and establishes a communication session with MFP 100. The communication session established here is a second communication session. The second communication session is not limited to a particular type, but may be a communication session in accordance with a communication protocol used in LAN 3. Second communication session establishing portion 263 outputs to relay portion 270 the session identification information and the connection identification information for identifying the second communication session.

In the case where the second communication session is established and the device information of MFP 100 is received, second session establishing portion 263 outputs to connection result transmitting portion 257 a tunnel connection result including the address information of MFP 100 of the connection request and the information indicating success of the tunnel connection. In the case where the second communication session is not established, second session establishing portion 263 outputs to connection result transmitting portion 257 a tunnel connection result including the address information of MFP 100 of the connection request and the information indicating failure of the tunnel connection. The case where second session establishing portion 263 fails to establish the second communication session, for example, may be the case where the power of MFP 100 is not turned on, or the case where MFP 100 is in trouble of being unable to communicate, and the like.

In the case where after the transmission instruction of the connection result is input from tunnel connection request receiving portion 255 the session identification information of the first communication session is input from first session establishing portion 259 as well as the tunnel connection result is input from second session establishing portion 263, connection result transmitting portion 257 transmits the tunnel connection result to management server 300 via the always-on session.

Relay portion 270 receives the session identification information and the connection identification information of the first communication session from first session establishing portion 259, and receives the session identification information and the connection identification information of the second communication session from second session establishing portion 263. Relay portion 270 uses the first communication session established by first session establishing portion 259 and the second communication session established by second session establishing portion 263, so as to relay communications between cloud server 400 and MFP 100. Relay portion 270 associates the session identification information of the first communication session with the session identification information of the second communication session, both of which have the same connection identification information. Further, relay portion 270 uses the first communication session and the second communication session specified by two of the session identification information associated with each other, to thereby relay communications between two devices respectively specified by the address information of a connection destination and the address information of a connection source included in the tunnel connection request. As a result, in the case where the first communication session is established by first session establishing portion 259, and the second communication session is established by second session establishing portion 263, it is possible to relay communications between two devices respectively specified by the address information of a connection destination and the address information of a connection source included in the tunnel connection request.

For example, in the case where the address information of a connection destination is the address information of cloud server 400 and the address information of a connection source is the address information of MFP 100, relay portion 270 uses the first communication session established with cloud server 400 and the second communication session established with MFP 100, to thereby relay communications. This allows data transmission/reception between cloud server 400 and MFP 100. Relay portion 270 associates the first communication session with the second communication session, transmits data received from cloud server 400 via the first communication session to MFP 100 via the second communication session, and transmits data received from MFP 100 via the second communication session to cloud server 400 via the first communication session.

Figure 8:
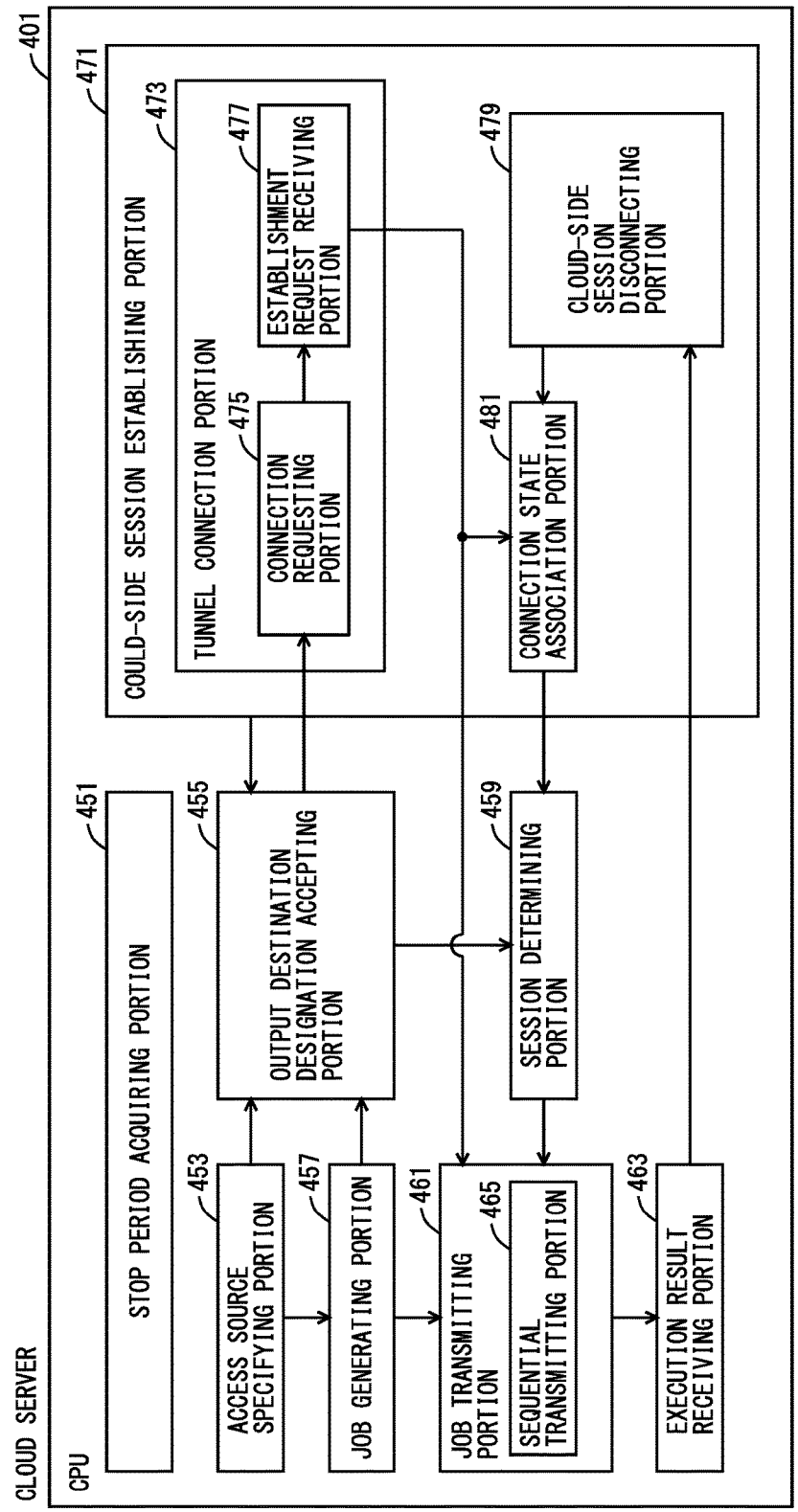
FIG. 8 is a block diagram showing, by way of example, the functions of a CPU included in the cloud server.

FIG. 8 is a block diagram showing, by way of example, the functions of a CPU included in the cloud server. The functions shown in FIG. 8 are formed in CPU 401 included in cloud server 400 as CPU 401 executes a control program stored in ROM 402, HDD 404, or CD-ROM 409A. Referring to FIG. 8, CPU 401 included in cloud server 400 includes: a stop period acquiring portion 451; an access source specifying portion 453; an output destination designation accepting portion 455; a job generating portion 457; a session determining portion 459; a job transmitting portion 461; an execution result receiving portion 463; and a cloud-side session establishing portion 471.

Stop period acquiring portion 451 acquires the stop period from management server 300. When communication portion 405 receives the stop period from management server 300, stop period acquiring portion 451 acquires the received stop period.

Access source specifying portion 453 specifies an access source which accesses cloud server 400. Cloud server 400 accepts an access from a PC connected to Internet 5 or LAN 3. For example, in the case where the user is registered as the access source for a service provided by cloud server 400, access source specifying portion 453 stores in HDD 404 in advance a pair of the user identification information and a password of the user who is previously registered. In response to an access from the PC, cloud server 400 transmits a login screen to the PC, and in the case where a pair of the user identification information and a password of the user received from the PC is stored in HDD 404, cloud server 400 specifies the user of the access source. Further, in the case where a device is registered as the access source for a service provided by cloud server 400, cloud server 400 stores in HDD 404 the device identification information of the device. Cloud server 400 specifies as the access source the device which has accessed in the case where the device identification information of the device which has accessed is stored in HDD 404.

When access source specifying portion 453 specifies the access source, access source specifying portion 453 transmits to job generating portion 457 and output destination designation accepting portion 455 the access source identification information for identifying the access source. The access source identification information is, in the case of specifying the user as the access source, the device identification information for identifying the PC operated by the user, and in the case of specifying a device as the access source, the access source identification information is the device identification information for identifying the device. As used herein, the device identification information is a network address. Further, access source specifying portion 453 outputs, in the case of specifying a plurality of access sources, to job generating portion 457 and output destination designation accepting portion 455 a plurality of pieces of access source identification information for identifying each of the plurality of access sources.

Job generating portion 457 receives the access source identification information from access source specifying portion 453. Job generating portion 457 generates a job in accordance with an operation received from the access source specified by the access source identification information. For example, in the case where the user is specified as the access source, as well as the user uses the PC to transmit data and a printing instruction to cloud server 400, job generating portion 457 generates a job for printing the received data. Job generating portion 457 outputs the generated job to job transmitting portion 461, while transmitting to output destination designation accepting portion 455 a pair of the access source identification information and the job ID for specifying the job. In the case where the plurality of pieces of access source identification information are input from access source specifying portion 453, job generating portion 457 generates, in accordance with operations received from each of a plurality of access sources respectively specified by each of the plurality of pieces of the access source identification information, a plurality of jobs respectively corresponding to each of the plurality of access sources. Job generating portion 457 outputs the plurality of jobs to job transmitting portion 461, while outputting to output destination designation accepting portion 455 a pair of the access source identification information and the job ID of the job corresponding thereto, for each of the plurality of pieces of access source identification information.

Cloud-side session establishing portion 471 controls communication portion 405 so as to establish a global session with management server 300. Cloud-side session establishing portion 471 outputs to output destination designation accepting portion 455 the session identification information of the established global session.

Output destination designation accepting portion 455 receives the access source identification information from access source specifying portion 453, receives the session identification information of the global session from cloud-side session establishing portion 471, and receives the pair of the access source identification information and the job ID from job generating portion 457. Output destination designation accepting portion 455 specifies the output destination in accordance with an operation received from the access source specified by the access source identification information. Output destination designation accepting portion 455 controls communication portion 405 so as to receive the device identification information of gateway device 200 and the device identification information of each of MFPs 100, 100A, and 100B, via the global session specified by the session identification information input from cloud-side session establishing portion 471. Output destination designation accepting portion 455 controls communication portion 305 so as to transmit to the PC as the access source specified by the access source identification information input from access source specifying portion 453, a device selecting screen in which gateway device 200 and any one of MFPs 100, 100A, and 100B are able to be selected. In response to an event that an operation of selecting gateway device 200 and any one of MFPs 100, 100A, and 100B is received form the PC as the access source, output destination designation accepting portion 455 specifies the selected device as the output destination. For example, when the user who is operating the PC inputs, according to the device selecting screen, an operation of selecting gateway device 200 and MFP 100, the operation of selecting the device identification information of gateway device 200 and the device identification information of MFP 100 is received, and thus, output destination designation accepting portion 455 specifies as the output destination, MFP 100 designated by the device identification information of gateway device 200 and the device identification information of MFP 100. The output destination is a device caused to execute a job specified by the job ID. Hereinafter, the device caused to execute the job specified by the job ID is called "an output destination corresponding to the job ID".

Output destination designation accepting portion 455 receives, in the case where the plurality of pieces of the access source identification information are input from access source specifying portion 453, a plurality of pairs of the access source identification information and the job IDs. Output destination designation accepting portion 455 specifies, for each of the pairs, the output destination in accordance with the operation received from the access source specified by the access source identification information included in the pair. Accordingly, output destination designation accepting portion 455 specifies, for each of the plurality of the job IDs respectively corresponding to each of the plurality of pieces of access source identification information, the output destination corresponding to the job ID.

It should be noted, output destination designation accepting portion 455 may receive from management server 300 in advance the device identification information of gateway device 200 and the device identification information of each of MFPs 100, 100A, and 100B, to store in HDD 404. Further, the device identification information of gateway device 200 and the device identification information of each of MFPs 100, 100A, and 100B may be input by an administrator who manages cloud server 400, to be stored in HDD 404.

A period during which management server 300 provides a service is specified on the basis of the stop period acquired by stop period acquiring portion 451. The period is not the stop period if the present time and date is not included in the stop period. Hereinafter, the case where the present time and date is not included in the stop period and the case where the present time and date is included in the stop period will be described separately.

<The Case where the Present Time and Date is not Included in the Stop Period>

If not in the stop period, output destination designation accepting portion 455 outputs to cloud-side session establishing portion 471, in response to an event that the output destination corresponding to the job ID is specified, a connection instruction including the address information of the specified output destination and the job ID. In the case where a plurality of output destinations corresponding to each of a plurality of job IDs are specified, output destination designation accepting portion 455 outputs to cloud-side session establishing portion 471, for each of the plurality of job IDs, the connection instruction including the job ID and the address information of the output destination corresponding to the job ID. It is here assumed, by way of example, that MFP 100 is selected as the output destination by access source specifying portion 453, and the address information of the output destination includes the device identification information of gateway device 200 and the device identification information of MFP 100.

Cloud-side session establishing portion 471 includes a tunnel connection portion 473, a cloud-side session disconnecting portion 479, and a connection state association portion 481. Tunnel connection portion 473 includes a connection requesting portion 475 and an establishment request receiving portion 477.

In response to an event that the connection instruction is input from output destination designation accepting portion 455, connection requesting portion 475 determines the address information of a connection destination on the basis of the job ID included in the connection instruction, determines as the address information of a connection source the address information of an output destination included in the connection instruction, and controls communication portion 405 so as to transmit to management server 300 a connection request including the address information of the connection destination and the address information of the connection source, via the global session. The address information of the connection source is the address information of the output destination, which is here the address information of MFP 100. The address information of MFP 100 includes the device identification information of gateway device 200 and the device identification information of MFP 100. The address information of the connection destination is the address information of cloud server 400, and includes the job ID. The address information of cloud server 400 is a URL for accessing from MFP 100 to cloud server 400. The URL includes a network address (domain name) of cloud server 400, a Web page identifier, a job ID included in the connection instruction, and a listening port number. In response to an event that the connection request is transmitted, connection requesting portion 475 outputs to establishment request receiving portion 477 the address information of the connection destination and the address information of the connection source. In the case where a plurality of connection instructions are input from output destination designation accepting portion 455, connection requesting portion 475 transmits to management server 300 a plurality of connection requests respectively corresponding to each of the plurality of connection instructions, via the global session. In the case where the plurality of connection instructions are input from output destination designation accepting portion 455, connection requesting portion 475 outputs to establishment request receiving portion 477 a pair of the address information of the connection destination and the address information of the connection source corresponding to each of the plurality of connection instructions.

After the address information of the connection destination and the address information of the connection source are input from connection requesting portion 475, establishment request receiving portion 477 controls communication portion 405, and in response to an event that an establishment request including the same address information as the address information of the connection destination is received, establishment request receiving portion 477 establishes a communication session with a device which has transmitted the establishment request. As mentioned above, the establishment request is transmitted from gateway device 200 which receives the connection request transmitted from management server 300. It is here assumed that the address information of the connection destination is the address information of cloud server 400, which is a URL including the job ID. In this case, the establishment request is a GET command including the URL as the address information of cloud server 400. Establishment request receiving portion 477 establishes a communication session with gateway device 200 which has transmitted the establishment request. The communication session established here with gateway device 200 is a first communication session. Further, the URL included in the GET command as the establishment request includes the job ID, and thus, it is possible to determine which of jobs generated by job generating portion 457 corresponds to the establishment request. Establishment request receiving portion 477 outputs to job transmitting portion 461 and connection state association portion 481 a pair of session identification information of the first communication session established with gateway device 200, the job ID included in the address information of the connection destination and the address information of the connection source.

In the case where a plurality of pairs of the address information of the connection destination and the address information of the connection source are input from connection requesting portion 475, establishment request receiving portion 477 establishes for each of the plurality of pairs, in response to an event that the establishment request including the same address information as the address information of the connection destination included in the pair is received, the first communication session with a device which has transmitted the establishment request, and establishment request receiving portion 477 outputs to job transmitting portion 461 and connection state association portion 481 the session identification information of the first communication session, the job ID included in the address information of the connection destination included in the pair, and the address information of the connection source included in the pair.

In response to an event that a pair of the session identification information of the first communication session, the job ID and the address information of the connection source are input from establishment request receiving portion 477, connection state association portion 481 associates the session identification information of the first communication session with the address information of the connection source. Specifically, connection state association portion 481 stores in HDD 404 the output destination association information including the session identification information of the first communication session and the address information of the connection source. Further, connection state association portion 481 outputs to session determining portion 459 a pair of the session identification information of the first communication session and the address information of the connection course.

Job transmitting portion 461 receives from establishment request receiving portion 477 the pair of the session identification information of the first communication session, the job ID and the address information of the connection source, and receives the job from job generating portion 457. Job transmitting portion 461 specifies a pair including the job ID of the job input from job generating portion 457, from among the pairs of the session identification information of the first communication session, the job ID and the address information of the connection source which are input from establishment request receiving portion 477, and job transmitting portion 461 specifies the session identification information of the specified pair. Job transmitting portion 461 controls communication portion 305 so as to transmit the job input from job generating portion 457 to gateway device 200 via the first communication session specified by the specified session identification information. In response to transmission of the job, job transmitting portion 461 outputs to execution result receiving portion 463 a pair of the job ID and the session identification information.

In the case where a plurality of pairs of the session identification information of the first communication session, the job ID and the address information of the connection source are input from establishment request receiving portion 477, job transmitting portion 461 receives a plurality of the job IDs from job generating portion 457. Job transmitting portion 461 specifies, for each of the plurality of jobs input from job generating portion 457, a pair including a job ID of the job from among the plurality of pairs, and specifies the session identification information included in the specified pair. Job transmitting portion 461 controls communication portion 305 so as to transmit the job input from job generating portion 457 to gateway device 200 via the first communication session specified by the session identification information specified for the job ID. In response to transmission of the job, job transmitting portion 461 outputs to execution result receiving portion 463 a pair of the job ID and the session identification information.

A job transmitted to gateway device 200 by job transmitting portion 461 via the first communication session is received by gateway device 200 via the first communication session, and transmitted to MFP 100 via the second communication session. Then, MFP 100 executes the job received from gateway device 200, and transmits an execution result to gateway device 200. Gateway device 200 transmits to cloud server 400 via the first communication session the execution result received from MFP 100 via the second communication session.

In response to an event that the pair of the job ID and the session identification information is input from job transmitting portion 461, execution result receiving portion 463 controls communication portion 405 so as to receive the execution result via the first communication session specified by the session identification information. The execution result includes the job ID. In response to an event that the execution result including the same job ID as the job ID input from job transmitting portion 461 is received, execution result receiving portion 463 outputs a disconnection instruction to cloud-side session establishing portion 471. The disconnection instruction includes the session identification information to be paired with the job ID included in the execution result.

In response to an event that the disconnection instruction is input from execution result receiving portion 463, cloud-side session disconnecting portion 479 disconnects the first communication session specified by the session identification information included in the disconnection instruction. If the present time and date is included in the stop period, cloud-side session disconnecting portion 479 does not disconnect the first communication session specified by the session identification information included in the disconnection instruction. In response to disconnection of the first communication session, cloud-side session disconnecting portion 479 outputs a deletion instruction to connection state association portion 481. The disconnection instruction includes the session identification information of the disconnected first communication session. Further, in the case where there exist a plurality of pieces of the output destination association information including the address information of the same connection source among the output destination association information stored in HDD 404, cloud-side session disconnecting portion 479 selects one of the plurality of pieces of the output destination association information including the address information of the same connection source, and disconnects all of the first communication sessions specified by the session identification information included in one or more pieces of the output destination association information which have not been selected. Therefore, it is possible to transmit a job as long as there exits one of the first communication sessions for a device specified by the address information of one connection source. This allows network resources to be used effectively.

In response to an event that the deletion instruction is input from cloud-side session disconnecting portion 479, connection state association portion 481 dissolves the association between the first communication session specified by the session identification information included in the deletion instruction and the address information of the connection source. Specifically, connection state association portion 481 deletes the output destination association information including the same session identification information as the session identification information included in the disconnection instruction among the output destination association information stored in HDD 404.

<The Case where the Present Time and Date is Included in the Stop Period>

If the present time and date is included in the stop period, output destination designation accepting portion 455 outputs to session determining portion 459, in response to an event that an output destination corresponding to the job ID is specified, the connection instruction including the address information of the specified output destination and the job ID. In the case where a plurality of output destinations corresponding to each of a plurality of job IDs are specified, output destination designation accepting portion 455 outputs to session determining portion 459, for each of the plurality of job IDs, the connection instruction including the job ID and the address information of the output destination corresponding to the job ID. It is here assumed, by way of example, that MFP 100 is selected as the output destination by access source specifying portion 453, and the address information of the output destination includes the device identification information of gateway device 200 and the device identification information of MFP 100.

In response to an event that the connection instruction is input from output destination designation accepting portion 455, session determining portion 459 extracts, from among the output destination association information stored in HDD 404, the output destination association information in which the address information of the connection source is the same as the address information of the output destination included in the connection instruction, and session determining portion 459 outputs to job transmitting portion 461 a pair of the session identification information of the first communication session included in the extracted output destination association information, the job ID and the address information of the output destination included in the connection instruction. In the case where a plurality of connection instructions are input from output destination designation accepting portion 455, session determining portion 459 extracts for each of the plurality of connection instructions, from among the output destination association information stored in HDD 404, the output destination association information in which the address information of the connection source is the same as the address information of the output destination included in the connection instruction, and session determining portion 459 outputs to job transmitting portion 461 a pair of the session identification information of the first communication session included in the extracted output destination association information, the job ID and the address information of the output destination included in the connection instruction.

Job transmitting portion 461 receives from session determining portion 459 the pair of the session identification information of the first communication session, the job ID and the address information of the connection source, and receives the job from job generating portion 457. Job transmitting portion 461 specifies a pair including the job ID of the job input from job generating portion 457, from among the pairs of the session identification information of the first communication session, the job ID and the address information of the connection source which are input from session determining portion 459, and job transmitting portion 461 specifies the session identification information of the specified pair. Job transmitting portion 461 controls communication portion 305 so as to transmit the job input from job generating portion 457 to gateway device 200 via the first communication session specified by the specified session identification information. In response to transmission of the job, job transmitting portion 461 outputs to execution result receiving portion 463 a pair of the job ID and the session identification information.

There may be a case where job transmitting portion 461 receives a plurality of job IDs from job generating portion 457. In this case, job transmitting portion 461 receives a plurality of pairs of the session identification information of the first communication session, the job ID and the address information of the connection source. Job transmitting portion 461 specifies, for each of the plurality of jobs input from job generating portion 457, a pair including the job ID of the job from among the plurality of pairs, and specifies the session identification information included in the specified pair. Job transmitting portion 461 controls communication portion 305 so as to transmit the job input from job generating portion 457 to gateway device 200 via the first communication session specified by the session identification information specified for the job ID. In response to transmission of the job, job transmitting portion 461 outputs to execution result receiving portion 463 a pair of the job ID of the job and the session identification information.

Job transmitting portion 461 includes a sequential transmitting portion 465. Sequential transmitting portion 465 specifies, in the case where a plurality of jobs are input from job generating portion 457, the session identification information of the first communication session for each of the plurality of jobs. Sequential transmitting portion 465 associates the session identification information with each of the jobs. Then, in the case where a plurality of jobs are associated with the same session identification information, sequential transmitting portion 465 controls communication portion 405 so as to transmit the plurality of jobs in sequence via the first communication session specified by the session identification information associated with the plurality of jobs. There only exits one of the first communication session established with a device specified by the address information of the output destination accepted by output destination designation accepting portion 455. Therefore, in order for the plurality of jobs to be transmitted via the single communication session, the plurality of jobs are transmitted not in parallel, but in sequential.

A job transmitted to gateway device 200 by job transmitting portion 461 via the first communication session is received by gateway device 200 via the first communication session, and transmitted to MFP 100 via the second communication session. Then, MFP 100 executes the job received from gateway device 200, and transmits an execution result to gateway device 200. Gateway device 200 transmits to cloud server 400 via the first communication session the execution result received from MFP 100 via the second communication session. The execution result includes the job ID.

In response to an even that the pair of the job ID and the session identification information is input from job transmitting portion 461, execution result receiving portion 463 controls communication portion 405 so as to receive the execution result via the first communication session specified by the session identification information. In response to an event that the execution result including the same job ID as the job ID input from job transmitting portion 461 is received, execution result receiving portion 463 outputs a disconnection instruction to cloud-side session establishing portion 471.

If the present time and date is included in the stop period, cloud-side session disconnecting portion 479 does not disconnect the first communication session specified by the session identification information included in the disconnection instruction, although the disconnection instruction is input from execution result receiving portion 463.

In response to an event that the present time and date passes over the stop period, cloud-side disconnection portion 479 disconnects all of the first communication sessions. Specifically, when the present time and date passes over the stop period, cloud-side session disconnecting portion 479 reads out in sequence the output destination association information stored in HDD 404, and disconnects the first communication session specified by the session identification information included in the read out output destination association information. In response to disconnection of the first communication session, cloud-side session disconnecting portion 479 outputs the deletion instruction to connection state association portion 481.

In the case where the present time and date is included in the stop period, connection state association portion 481 transmits a dummy signal for each of pieces of the output destination association information stored in HDD 404 at a prescribed time interval via the first communication session specified by the session identification information included in the output destination association information, to thereby maintain the first communication session. The dummy signal is transmitted through gateway device 200 and via the second communication session to be paired with the first communication session, to a device specified by the output destination association information, for example, MFP 100. Therefore, the first communication session is not disconnected by gateway device 200, and the second communication session to be paired with the first communication session is not disconnected by gateway device 200 and MFP 100.

Further, in response to an event that the deletion instruction is input from cloud-side session disconnecting portion 479, connection state association portion 481 deletes the output destination association information specified by the session identification information included in the deletion instruction among the output destination association information stored in HDD 404.

Figure 9:
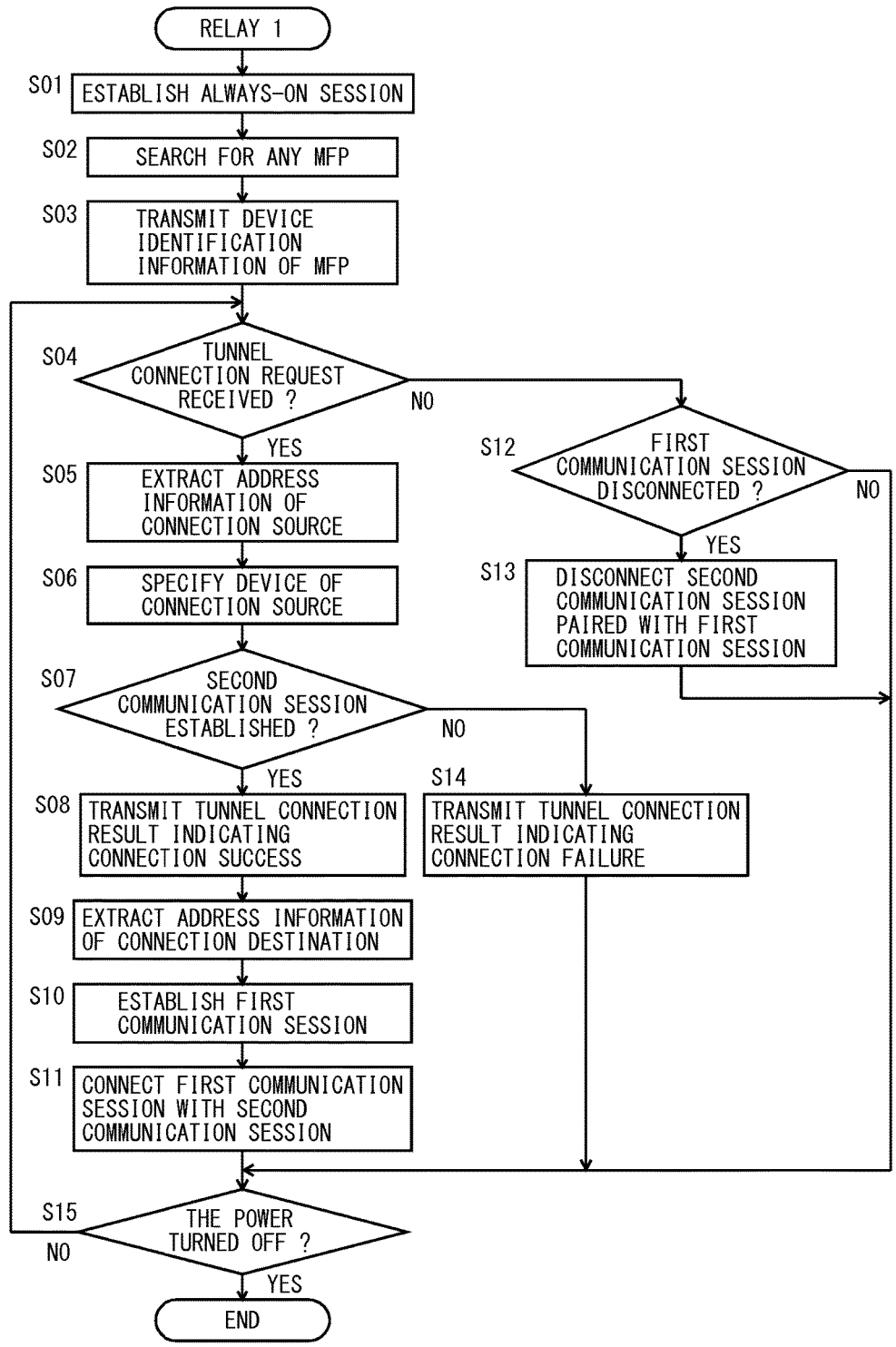
FIG. 9 is a flowchart illustrating an exemplary flow of a relay process.

FIG. 9 is a flowchart illustrating an exemplary flow of a relay process. The relay process is performed by CPU 201 included in gateway device 200 as CPU 201 executes a relay program stored in ROM 202, flash memory 204, or CD-ROM 209A. Referring to FIG. 9, CPU 201 included in gateway device 200 controls first communication portion 205 to establish an always-on session with management server 300 (step S01). CPU 201 uses a global IP address of management server 300 stored in flash memory 204 to transmit a communication session establishment request to management server 300, and performs prescribed negotiations with management server 300 to thereby establish the always-on session. The always-on session is not particularly limited, but it may be, for example, a message session based on XMPP.

In the following step S02, CPU 201 searches for any device connected to LAN 3 located inside the firewall. Specifically, CPU 201 broadcasts an inquiry over LAN 3, and acquires device identification information returned from each of MFPs 100, 100A, 100B, and thereby finds MFPs 100, 100A, and 100B. The device identification information may be, but not limited to, a local IP address assigned to each of MFPs 100, 100A, and 100B in LAN 3.

In the following step S03, CPU 201 transmits to management server 300 via the always-on session established in step S01 the device identification information of each of MFPs 100, 100A and 100B detected in step S02. This allows management server 300 to recognize MFPs 100, 100A and 100B connected to gateway device 200.

In the following step S04, CPU 201 determines whether or not a tunnel connection instruction has been received from management server 300 via the always-on session. If CPU 201 has received the tunnel connection instruction the process then proceeds to step S05; otherwise, the process proceeds to step S12.

In step S05, CPU 201 extracts the address information of a connection source from the tunnel connection request. Then, CPU 201 specifies a device of the connection source on the basis of the address information of the connection source (step S06). It is here assumed, by way of example, that the tunnel connection request includes the address information of MFP 100 as the address information of the connection source, and includes the address information of cloud server 400 as the address information of the connection destination. In this case, MFP 100 is specified as a device of the connection source.

In step S07, CPU 201 controls second communication portion 206 so as to establish a second communication session with MFP 100 specified as a device of the connection source. In step S06, CPU 201 transmits an establishment request of a communication session to MFP 100 specified as the device of the connection source, to thereby establish a second communication session with MFP 100. If the second communication session is established, the process proceeds to step S08; otherwise, the process proceeds to step S14. The case where second communication session fails to be established, for example, may be the case where the power of MFP 100 is not turned on, or the case where MFP 100 is in trouble of being unable to communicate, and the like. In step S14, CPU 201 transmits to management server 300 via the always-on session the device identification information of MFP 100 and the information indicating failure of the tunnel connection, and the process proceeds to step S15.

In step S08, CPU 201 transmits to management server 300 via the always-session a tunnel connection result including the address information of MFP 100 and the information indicating success of the tunnel connection, and the process proceeds to step S09.

In step S09, CPU 201 extracts the address information of a connection destination from the tunnel connection request received in step S04. Here, since the tunnel connection request includes the address information of cloud server 400 as the address information of the connection destination, the address information of cloud server 400 is extracted. In the following step S10, CPU 201 controls first communication portion 205, and uses the address information of the connection destination, to thereby establish a first communication session with cloud server 400. An address indicated by the address information of cloud server 400 extracted in step S09 is accessed, and this allows the first communication session to be established with cloud server 400.

In the following step S11, CPU 201 uses the first and second communication sessions to relay communications between cloud server 400 and MFP 100. For example, in the case where data is transmitted from cloud server 400 to MFP 100, CPU 201 receives the data from cloud server 400 via the first communication session, and transmits the received data to MFP 100 via the second communication session on behalf of cloud server 400. Further, in the case where an execution result is received from MFP 100 via the second communication session, CPU 201 transmits the execution result to cloud server 400 via the first communication session on behalf of MFP 100. The execution result includes the information indicating that the connection source is MFP 100.

In step S12, CPU 201 determines whether the first communication session established in step S10 has been disconnected. If the first communication session has been disconnected, the process proceeds to step S13; otherwise, the process proceeds to step S15. In step S13, CPU 201 disconnects the second communication session to be paired with the first communication session which has been disconnected in step S12, and the process proceeds to step S15. The second communication session to be paired with the disconnected first communication session is a second communication session which has been connected in step S11, with the disconnected first communication session. In step S15, CPU 201 determines whether the power has been turned off. If the power has been turned off, the process is terminated; otherwise, the process returns to step S04.

Figure 10:
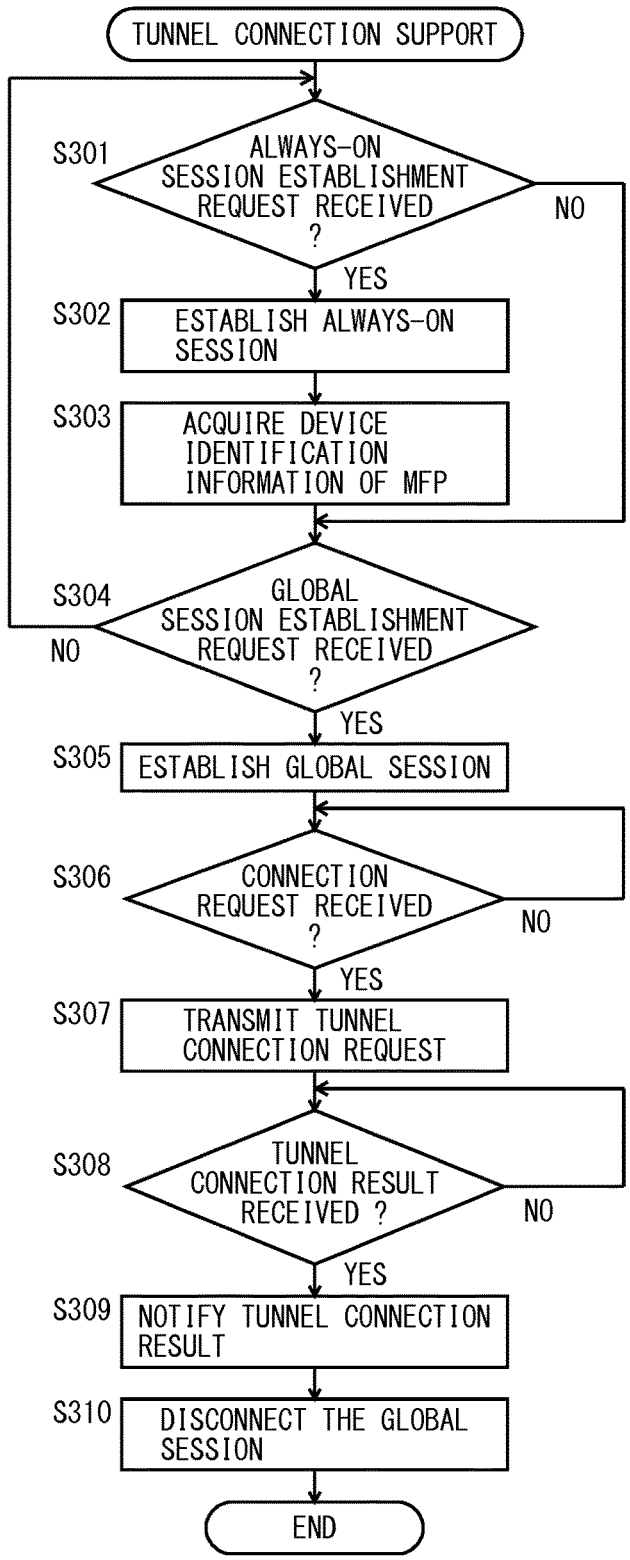
FIG. 10 is a flowchart illustrating an exemplary flow of a tunnel connection support process.

FIG. 10 is a flowchart illustrating an exemplary flow of a tunnel connection support process. The tunnel connection support process is carried out by CPU 301 included in management server 300 as CPU 301 executes a program stored in ROM 302, HDD 304, or CD-ROM 309A. Referring to FIG. 10, CPU 301 determines whether an establishment request of the always-on session is received (step S301). CPU 301 determines whether communication portion 305 receives an establishment request of a communication session for the always-on session from gateway device 200. If the establishment request of the always-on session is received, the process proceeds to step S302; otherwise, the process proceeds to step S304.

In step S302, CPU 301 establishes the always-on session with gateway device 200, and the process proceeds to step S303. In step S303, CPU 301 acquires the device identification information of an MFP from gateway device 200 via the always-on session. It is here assumed, by way of example, that the device identification information of each of MFPs 100, 100A, and 100B is acquired.

In step S304, CPU 301 determines whether an establishment request of a global session is received. CPU 301 determines whether communication portion 305 receives the establishment request of a global session from cloud server 400 disposed outside the firewall. If the establishment request of a global session is received, the process proceeds to step S305; otherwise, the process returns to step S301. In step S305, CPU 301 establishes the global session with cloud server 400, and the process proceeds to step S306.

In step S306, CPU 301 determines whether a connection request is received from cloud server 400. CPU 301 is in a standby state until the connection request is received (NO in step S306); if the connection request is received (YES in step S306), the process proceeds to step S307.

In step S307, CPU 301 transmits a tunnel connection request to gateway device 200 via the always-on session established in step S301. The tunnel connection request is a packet in which the connection request is capsulated in accordance with a protocol specified by the always-on session. Gateway device 200 which receives the tunnel connection request establishes the second communication session with MFP 100, and returns as a result the tunnel connection result.

In step S308, CPU 301 determines whether the tunnel connection result is received from gateway device 200 via the always-on session. CPU 301 is in a standby state until the tunnel connection result is received (NO in step S308); and if the tunnel connection result is received (YES in step S308), the process proceeds to step S309. The tunnel connection result includes: a tunnel connection result including the information of success of the tunnel connection and the address information of the connection source; and a tunnel connection result including the information of failure of the tunnel connection and the address information of the connection source.

In step S309, CPU 301 notifies a device which has transmitted the connection request, that is, cloud server 400 here, of the tunnel connection result. Specifically, CPU 301 transmits the tunnel connection result via the global session established in step S305. In step S310, CPU 301 disconnects the global session established in step S305, and the process is terminated.

Figure 11:
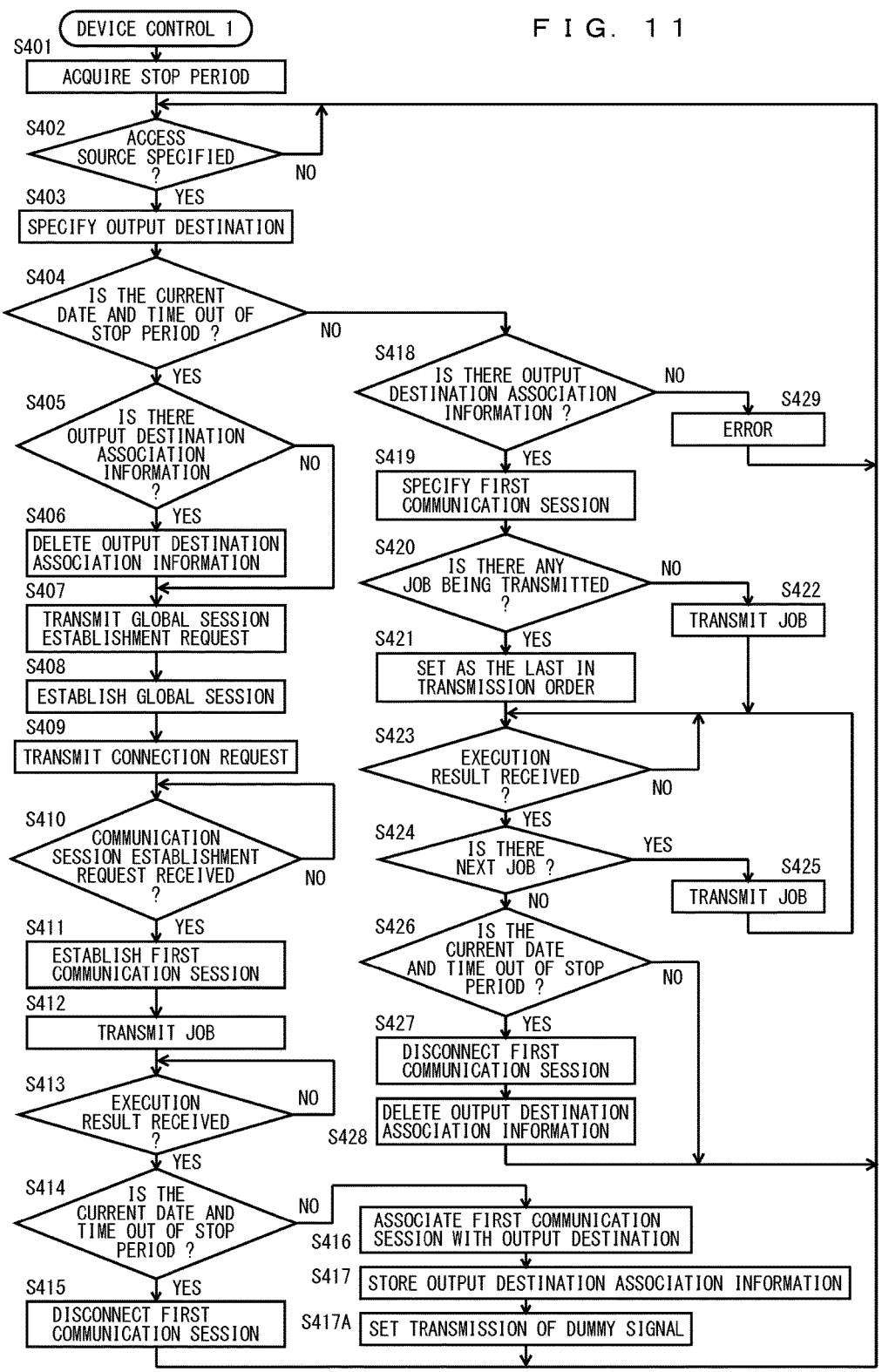
FIG. 11 is a flowchart illustrating an exemplary flow of a device control process.

FIG. 11 is a flowchart illustrating an exemplary flow of a device control process. The device control process shown in FIG. 11 is a process executed by CPU 401 in the case where there exists one access source. In the case where there exist a plurality of access sources, CPU 401 executes the device control process shown in FIG. 11 on each of the plurality of access sources. The device control process is carried out by CPU 401 included in cloud server 400 as CPU 401 executes a program for providing a service. Hereinafter, among processes executed by cloud server 400, a process for cloud server 400 to cause MFP 100 to execute will be described. Referring to FIG. 11, CPU 401 included in cloud server 400 acquires the stop period (step S401). When communication portion 405 receives the stop period from management server 300, CPU 401 acquires the stop period.

In the following step S402, CPU 401 determines whether an access source is specified. CPU 401 is in a standby state until the access source is specified (NO in step S402); if the access source is specified (YES in step S402), the process proceeds to step S403. The access source is a PC operated by the user who is operating cloud server 400. When communication portion 405 accepts an access from a PC connected to Internet 5 or LAN 3, CPU 401 specifies the PC as the access source. For example, in the case where a login screen is transmitted to the PC, and a pair of the user identification information and a password received from the PC is stored in HDD 404 in advance, CPU 401 specifies the PC as the access source. Further, the device identification information of the device which has accessed is stored in HDD 404 in advance, CPU 401 specifies as the access source the device which has accessed.

In the following step S403, CPU 401 specifies an output destination, and specifies as the output destination a device specified by the user who is operating a PC of the access source. Specifically, CPU 401 receives from management server 300 the device identification information of gateway device 200 and the device identification information of each of MFPs 100, 100A, and 100B, and stores in HDD 404 in advance as a candidate for the output destination a pair of the received device identification information of gateway device 200 and the received device identification information of each of MFPs 100, 100A, and 100B. CPU 401 controls communication 305 so as to transmit to the access source specified in step S402 a device selecting screen in which gateway device 200, and any one of MFPs 100, 100A, and 100B are able to be selected, and in response to reception of an operation of selecting gateway device 200 and any one of MFPs 100, 100A, and 100B, CPU 401 specifies the selected device as the output destination. For example, when the user who operates the PC inputs into the PC, in accordance with the device selecting screen, an operation of selecting gateway device 200 and MFP 100, an operation of selecting the device identification information of gateway device 200 and the device identification information of MFP 100 is received, and then MFP 100 specified by the device identification information of gateway device 200 and the device identification information of MFP 100 is specified as the output destination. Hereinafter, it is assumed, by way of example, that MFP 100 is specified as the output destination.

Then, CPU 401 determines whether the present time and date is included in the stop period (step S404). If the present time and date is not included in the stop period, the process proceeds to step S405; otherwise, the process proceeds to step S418. In step S405, CPU 401 determines whether the output destination association information is stored in HDD 404. The output destination association information is stored in HDD 404 in step S417 as described below. If the output destination information is stored in HDD 404, the process proceeds to step S406; otherwise, the process skips S406 and proceeds to step S407. In step S406, CPU 401 deletes all of the output destination association information stored in HDD 404, and the process proceeds to step S407. If the present time and date is not included in the stop period, management server provides a service and this allows the tunnel connection with the output destination through management server 300.

In step S407, CPU 401 controls communication portion 305 so as to transmit to management server 300 an establishment request for establishing a global session with management server which manages a device specified as an output destination in step S403. The device which manages the device specified as the output destination is a device which has transmitted the device identification information of the device specified as the output destination, here, it may be management server 300. In the following step S408, CPU 401 performs negotiations with management server 300 so as to establish a global session as a communication session with management server 300. In this case, management server 300 may request authentication information for authenticating that the user is registered in management server 300, and the global session as the communication session may be established on the condition that the authentication succeeds. This allows restricting a user who is accessible to MFPs 100, 100A, and 100B inside the firewall, to a user who is registered in management server 300.

In the following step S409, CPU 401 transmits a connection request to management server 300 via the global session established in step S408. The connection request includes the address information of MFP 100 as the address information of a connection source, and a URL as the address information of a connection destination. The URL includes a network address (domain name) of cloud server 400, a Web page identifier, an identifier (job ID) of the job executed by cloud server 400, and a listening port number.

In the following step S410, CPU 401 determines whether an establishment request of a communication session is received. The establishment request as used herein corresponds to a connection request transmitted to management server 300 in step S409. The connection request transmitted to management server in step S409 includes the address information of a connection source and the address information of a connection destination. The address information of a connection destination is the address information of cloud server 400, which may be a URL. Further, the establishment request includes the address information of the connection destination included in the connection request. Here, the establishment request includes an access to the URL of cloud server 400. Therefore, in step S410, CPU 401 receives an establishment request of a communication session received from gateway device 200, as an establishment request corresponding to the connection request transmitted to management server 300 in step S409. CPU 401 is in a standby state until the establishment request of the communication session is received (NO in step S410); if the establishment request of the communication session is received (YES in step S410), the process proceeds to step S411.

In step S411, CPU 401 establishes a first communication session corresponding to the establishment request of a communication session, and the process proceeds to step S412. CPU 401 establishes the first communication session with a device which transmits the establishment request of a communication session, here, it may be gateway device 200.

In step S412, CPU 401 transmits a job via the first communication session. A transmission destination of a job is gateway device 200 here, as mentioned above, the job transmitted via the first communication session is transmitted by gateway device 200 to MFP 100 via the second communication session established between gateway device 200 and MFP 100. Therefore, the job is actually transmitted to MFP 100.

In the following step S413, CPU 401 determines whether an execution result is received via the first communication session. CPU 401 is in a standby state until the execution result is received (NO in step S413); if the execution is received (YES in step S413), the process proceeds to step S414.

In step S414, CPU 401 determines whether the present time and date is included in the stop period. If the present time and date is not included in the stop period, the process proceeds to step S415; otherwise, the process proceeds to step S416. In step S415, CPU 401 disconnects the first communication session established in step S411, and the process returns to step S402.

In step S416, CPU 401 associates the first communication session established in step S411 with the device specified as the output destination in step S403. Here, CPU 401 generates the output destination association information including the session identification information of the first communication session established in step S411, and the address information of the device specified as the output destination in step S403. Then, CPU 401 stores the generated output destination association information in HDD 404 (step S417), and the process proceeds to step S417A.

In step S417A, CPU 401 sets transmitting a dummy signal via the first communication session at prescribed time intervals, and the process returns to step S402. The dummy signal is set to be transmitted via the first communication session at prescribed time intervals, and this prevents the first communication session from being disconnected depending on a device of the other side of the first communication session.

On the other hand, in step S418, CPU 401 determines whether the output destination association information corresponding to a device specified as the output destination in step S403 is stored in HDD 404. Specifically, if the output destination association information including the address information of the device specified as the output destination in step S403 is extracted from the output destination association information stored in HDD 404, the process proceeds to step S419; otherwise, the process proceeds to step S428. In step S428, the process returns to step S402, as an error process. For example, a message which notifies that a connection to the output destination is not available is transmitted to the device specified as an access source in step S402.

In step S419, CPU 401 specifies a first communication session for the device specified as the output destination in step S403. CPU 401 specifies the first communication session specified by the session identification information included in the output destination association extracted in step S418.

Then, CPU 401 determines whether there exists a job being in transmission via the first communication session specified in step S419 (step S420). If there exists the job being in transmission, the process proceeds to step S421; otherwise, the process proceeds to step S422. In the case where the device control process is executed on another access source, there may be the case where a job is transmitted via the same first communication session. In step S421, CPU 401 sets as the last the order of transmitting a job targeted to be processed, and the process proceeds to step S423. In step S422, CPU 401 transmits the job targeted to be processed, via the first communication session specified in step S419, and the process proceeds to step S423.

In step S423, CPU 401 determines whether an execution result is received via the first communication session specified in step S419. CPU 401 is in a standby state until the execution result is received (NO in step S423); if the execution result is received (YES in step S423), the process proceeds to step S424.

In step S424, CPU 401 determines whether there exists a not-yet-transmitted job among jobs to which the order of transmission is assigned in step S421. If there exists a not-yet-transmitted job, the process proceeds to step S425; otherwise, the process proceeds to step S426. In step S423, CPU 401 transmits a job in the earliest of the order of transmission, via the first communication session specified in step S419, and the process proceeds to step S423.

In step S426, CPU 401 determines whether the present time and date is included in the stop period. If the present time and date is not included in the stop period, the process proceeds to step S427; otherwise, the process returns to step S402. In step S427, CPU 401 disconnects the first communication session specified in step S419, and the process returns to step S402.

As described above, cloud server 400 according to the present embodiment is capable of: acquiring the stop period indicating a period during which management server 300 refrains from providing a service; in the case of not in the stop period, transmitting to management server 300 a connection request including the address information of cloud server 400 as the address information of a connection destination, and the address information of MFP 100 as the address information of a connection source; establishing a first communication session with gateway device 200 in the case where an establishment request including the same address information as the address information of a connection destination included in the the connection request is received from gateway device 200 which receives the connection request forwarded from management server 300; after the first communication session has been established, in response to an event that a result of execution of a job transmitted to MFP 100 is received from MFP 100, disconnecting the first communication session on the condition of not in the stop period; and in the case of being in the stop period, disconnecting the first communication session after the stop period has finished. Further, in the case where the user of an access source is specified in the stop period, cloud server 400 transmits a job to MFP 100 on the basis of an operation by the user specified in the stop period, via the first communication session. This allows, in the stop period during which management server 300 refrains from providing a service, transmitting the job to MFP 100 by using the first communication session established before the stop period starts. In other words, this allows transmitting the job to MFP 100 inside the firewall from cloud server 400 outside the firewall in a period during which management server refrains from providing a service.

Further, cloud server 400 transmits a connection request to management server 300 outside the firewall, to thereby establish the first communication session with gateway device 200 inside the firewall. Gateway device 200 establishes the second communication session with MFP 100 as a control target device, and relays communications between cloud server 400 and MFP 100 by using the first communication session and the second communication session. Therefore, as cloud server 400 transmits to management server 300 outside the firewall a connection request including the address information of MFP 100 inside the firewall, cloud server 400 can transmit a job to MFP 100 inside the firewall.

Further, in the case where a plurality of users are specified in the stop period during which management server 300 refrains from providing a service, cloud server 400 transmits a plurality of jobs on the basis of each of the operations by the plurality of users, to MFP 100 in sequence via the first communication session. This allows transmitting the plurality of jobs to MFP 100.

Further, during the time that the first communication session is established, cloud server 400 stores in HDD 404 the session identification information of the first communication session and the output destination association information designated by the user from among MFPs 100, 100A, and 100B, and in the case where the user is specified in the stop period, on the condition that there exists the session identification information associated with the address information of the device designated by the specified user from among MFPs 100, 100A, and 100B, in other words, on the condition that the output destination association information including the address information designated by the user is stored in HDD 404, cloud server 400 transmits the job on the basis of the user's operation via the first communication session specified by the session identification information. This allows transmitting the job to the control target device selected by user from among MFPs 100, 100A, and 100B, in the stop period.

In the case where a piece of the address information is associated with a plurality of pieces of the session identification information by the output destination association information stored in HDD 404, cloud server 400 disconnects the first communication session specified by the session identification information other than a piece of the session identification information selected from among the plurality of pieces of session identification information. This allows transmitting the job by a piece of the first communication session to each of MFPs 100, 100A, and 100B. As a result, this allows network resources to be used effectively.

<Modification>

In the information processing system 1 as described above, cloud server 400 is capable of: establishing the first communication session with gateway device 200 through management server 300; performing the tunnel connection with MFP 100; and during the time that the tunnel connection is established, when management server refrains from providing a service, maintaining the tunnel connection only in the stop period during which the service is not provided. Therefore, only the first communication session which has been established before the stop period started is maintained.

In the information processing system 1 according to the modification, gateway device 200 stores a communication history of the tunnel connection established before the stop period starts, and when the stop period starts, gateway device 200 re-establishes the tunnel connection on the basis of the communication history, to thereby maintain the tunnel connection which has been re-established only in the stop period. Hereinafter, different points between the information processing system 1 according to the modification and the above described information processing system 1 will be described, and an overlapping description will not be repeated.

FIG. 12 is a block diagram showing, by way of example, the functions of a CPU included in the management server according to a modification. Referring to FIG. 12, differences from the functions shown in FIG. 6 are as follows: stop period notification 387 is deleted from global session establishing portion 353; and a stop notification portion 379 is added to server-side session establishing portion 351. The other functions are the same as the functions shown in FIG. 6, and therefore a description will be not repeated. Stop period notification portion 379 notifies gateway device 200 of the stop period during which management server 300 refrains from providing a service. Stop period notification portion 379 transmits the stop period to gateway device 200 at the stage where the always-on session is established with gateway device 200 by server-side session establishing portion 351. Stop period notification portion may transmit the stop period at an arbitrary timing, for example, in response to a request from gateway device 200.

Figure 13:
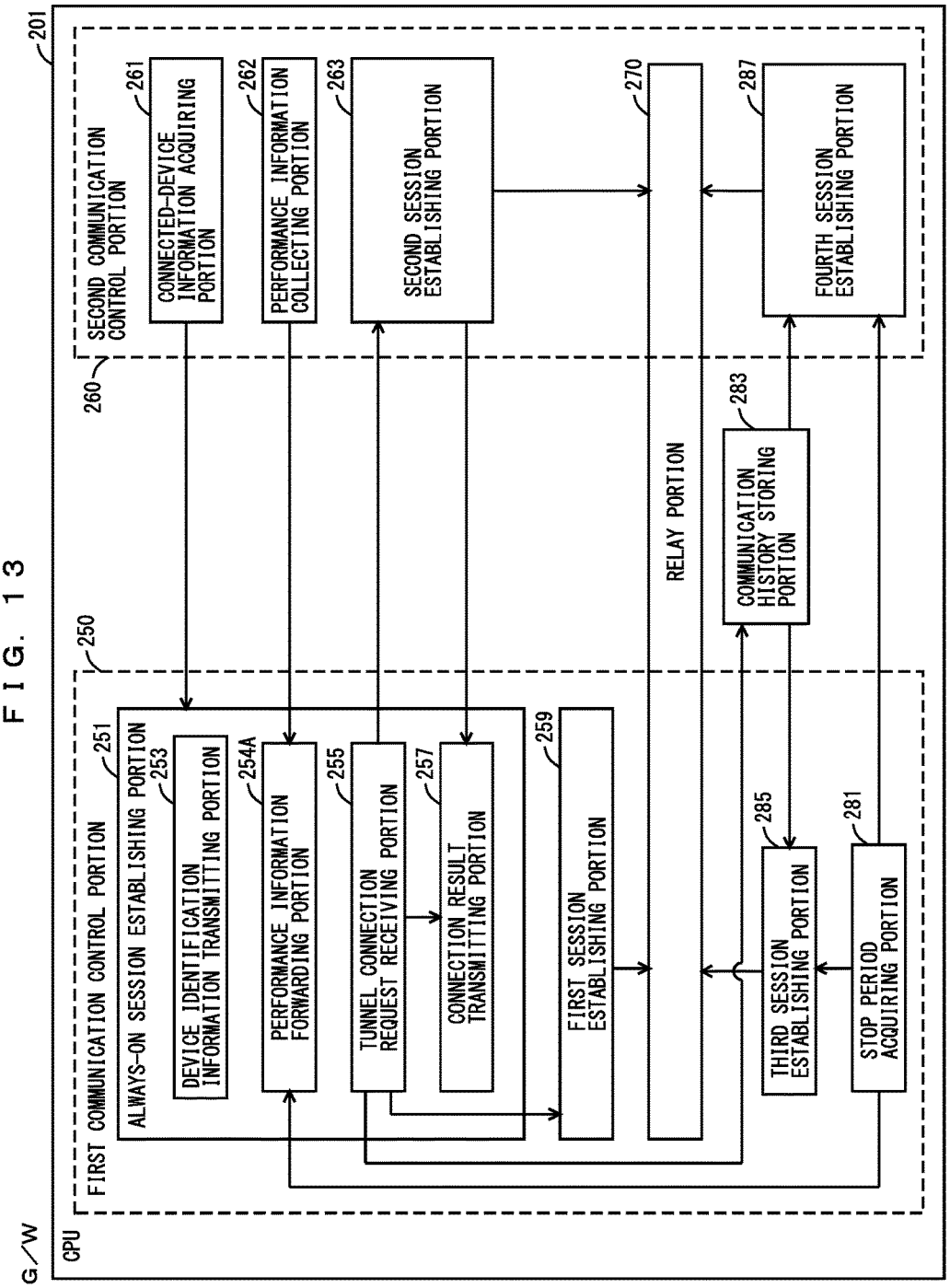
FIG. 13 is a block diagram showing, by way of example, the functions of a CPU included in the gateway device according to the modification.

FIG. 13 is a block diagram showing, by way of example, the functions of a CPU included in the gateway device according to the modification. Referring to FIG. 13, differences from the functions shown in FIG. 7 are as follows: a communication history storing portion 283 is added; a stop period acquiring portion 281 and a third session establishing portion 285 are added to first communication control portion 250; a fourth session establishing portion 287 is added to second communication control portion 260; and performance information forwarding portion 254 is changed to a performance information forwarding portion 254A. The other functions are the same as the functions shown in FIG. 7.

Stop period acquiring portion 281 acquires the stop period from management server 300. In response to an event that first communication portion 205 receives the stop period from management server 300, stop period acquiring portion 281 acquires the received stop period. Stop period acquiring portion 281 outputs the acquired stop period to performance information forwarding portion 254A, third session establishing portion 285 and fourth session establishing portion 287. Here, stop period acquiring portion 281 may receive the stop period via the always-on session or may establish another session to receive the stop period.

Performance information forwarding portion 254A receives the stop period from stop period acquiring portion 281, and receives the performance information from performance information collecting portion 262. In the case where the present time and date is not included in the stop period, in response to an event that the performance information is input from performance information collecting portion 262, performance information forwarding portion 254A transmits the performance information to management server 300 via the always-on session. In the case where the present time and date is included in the stop period, performance information forwarding portion 254A temporarily stores in RAM 203 the performance information input from performance information collecting portion 262 until the next always-on session is established, and in response to an event that the next always-on session is established, performance information forwarding portion 254A transmits to management server 300 via the always-on session the performance information temporarily stored in RAM 203.

Communication history storing portion 283 acquires the connection request included in the tunnel connection request every time when tunnel connection request receiving portion 255 receives the tunnel connection request from management server 300. The connection request includes the address information of the connection source and the address information of the connection destination. Communication history storing portion 283 generates the communication history on the basis of the connection request, and outputs the generated communication history to third session establishing portion 285 and fourth session establishing portion 287. For example, communication history storing portion 283 stores the communication history in flash memory 204, and thereby outputs the communication history to third session establishing portion 285 and fourth session establishing portion 287. In the case where the communication history including the same address information of the connection source and the same address information of the connection destination as those included in the connection request is already stored in flash memory 204, communication history storing portion 283 does not store the communication history in flash memory 204. The communication history includes the address information of the connection source and the address information of the connection destination included in the connection request. It is here assumed, by way of example, that the connection request includes the address information of MFP 100 as the address information of the connection source, and the address information of cloud server 400 as the address information of the connection destination. The address information of cloud server 400 included in the connection request is used for first session establishing portion 259 to establish the first communication session. The address information of MFP 100 included in the connection request is used for second session establishing portion 263 to establish the second communication session. Therefore, the communication history indicates that relay portion 270 relays communications between cloud server 400 and MFP 100 by using the first communication session and the second communication session.

Third session establishing portion 285 receives the stop period from stop period acquiring portion 281, and receives the communication history from communication history storing portion 283. In response to an event that the stop period starts, third session establishing portion 285 controls first communication portion 205 so as to specify the network address of cloud server 400 on the basis of the address information of the connection source included in the communication history, which will be the address information of cloud server 400 here, transmit the establishment request to cloud server 400, and thereby establish communication sessions with cloud server 400. Hereinafter, the establishment request transmitted to cloud server 400 by third session establishing portion 285 will be called an re-establishment request. The re-establishment request includes the address information of the connection source included in the communication history, which will be the address information of MFP 100 here. Here, the communication session established with cloud server 400 by third session establishing portion 285 is called a third communication session. In response to an event that third communication session is established, third session establishing portion 285 outputs to relay portion 270 a pair of the session identification information for identifying the third communication session and the history identification information for identifying the communication history. After the third communication session has been established, third session establishing portion 285 maintains the third communication session until the stop period finishes; when the stop period finishes, third session establishing portion 285 disconnects the third communication session. Specifically, in the case where the present time and date is included in the stop period, third session establishing portion 285 transmits the dummy signal to cloud server at prescribed time intervals via the third communication session. Cloud server 400 does not disconnect the third communication session during the time that the dummy signal is received, and thus, the third communication session is maintained in the stop period.

In the case where a plurality of pieces of communication history is input from communication history storing portion 283, in response to an event that the stop period starts, third session establishing portion 285 controls first communication portion 205 to transmit, for each of the plurality of pieces of communication history, the re-establishment request by using the address information of the connection source included in the communication history, which will be the network address of cloud server 400 determined by the address information of cloud server 400 here, establish a plurality of third communication sessions with cloud server 400, and output to relay portion 270 a pair of the session identification information for identifying the third communication session and the history identification information for identifying the communication history. After the plurality of third communication sessions have been established, third session establishing portion 285 maintains the plurality of third communication sessions until the stop period finishes; when the stop period finishes, third session establishing portion 285 disconnects all of the plurality of third communication sessions.

Fourth session establishing portion 287 receives the stop period from stop period acquiring portion 281, and receives the communication history from communication history storing portion 283. In response to an event that the stop period starts, fourth session establishing portion 287 controls second communication portion 206 to use the address information of the connection source included in the communication history, which will be the address information of MFP 100 here, to transmit to MFP 100 the establishment request of communication session, and thereby establish a communication session with MFP 100. Here, the communication session established with MFP 100 by fourth session establishing portion 287 is called a fourth communication session. The fourth communication session is not limited to a particular type, but may be a communication session in accordance with a communication protocol used in LAN 3. Fourth session establishing portion 287 outputs to relay portion 270 a pair of the session identification information for identifying the fourth communication session and the history identification information for identifying the communication history. After the fourth communication session has been established, fourth session establishing portion 287 maintains the fourth communication session until the stop period finishes; when the stop period finishes, fourth session establishing portion 287 disconnects the fourth communication session. Specifically, in the case where the present time and date is included in the stop period, fourth session establishing portion 287 transmits the dummy signal to a device specified by the address information of the connection source included in the communication history, which will be MFP 100 here, at a prescribed time interval via the fourth communication session. MFP 100 does not disconnect the fourth communication session during the time that the dummy signal is received, and thus, the fourth communication session is maintained in the stop period.

In the case where a plurality of pieces of communication history is input from communication history storing portion 283, in response to an event that the stop period starts, fourth session establishing portion 287 controls second communication portion 206 to establish the fourth communication session for each of the plurality of pieces of communication history by using the address information of the connection source included in the communication history, and transmit to relay portion 270 a pair of the session identification information for identifying the fourth communication session and the history identification information of the communication history. After the plurality of fourth communication sessions have been established, fourth session establishing portion 287 maintains the plurality of fourth communication sessions until the stop period finishes; when the stop period finishes, fourth session establishing portion 287 disconnects all of the plurality of fourth communication sessions.

Relay portion 270 receives a pair of the session identification information and the history identification information of the third communication session from third session establishing portion 285, and receives a pair of the session identification information and the history identification information of the fourth communication session from fourth session establishing portion 263. In the case where a plurality of pieces of communication history are stored by communication history storing portion 283, relay portion 270 receives from third session establishing portion 285 the same number of the pair of the session identification information and the history identification information of the third communication session as the number of the pieces of communication history, and receives from fourth session establishing portion 263 the same number of the pair of the session identification information and the history identification information of the fourth communication session as the number of the pieces of communication history. Relay portion 270 associates the third communication session with the fourth communication session, both of which have the same history identification information.

For example, in the case where a first piece of communication history includes the address information of cloud server 400 as the address information of the connection destination, and the address information of MFP 100 as the address information of the connection source, third session establishing portion 285 establishes the third communication session with cloud server 400 on the basis of the first piece of communication history, and fourth session establishing portion 285 establishes the fourth communication session with MFP 100 on the basis of the first communication history. Further, in the case where a second piece of communication history includes the address information of cloud server 400 as the address information of the connection destination, and the address information of MFP 100A as the address information of the connection source, third session establishing portion 285 establishes the third communication session with cloud server 400 on the basis of the second piece of communication history, and fourth session establishing portion 285 establishes the fourth communication session with MFP 100A on the basis of the second communication history.

Relay portion 270 uses the third communication session established with cloud server 400 on the basis of the first piece of communication history, and the fourth communication session established with MFP 100 on the basis of the first piece of communication history, and thereby relays communications between cloud server 400 and MFP 100. Relay portion 270 transmits data received from cloud server 400 via the third communication session established with cloud server 400 on the basis of the first piece of communication history, to MFP 100 via the fourth communication session established with MFP 100 on the basis of the first piece of communication history; relay portion 270 transmits data received from MFP 100 via the fourth communication session established with MFP 100 on the basis of the first piece of communication history, to cloud server 100 via the third communication session established with cloud server 400 on the basis of the first piece of communication history. Further, relay portion 270 uses the third communication session established with cloud server 400 on the basis of the second piece of communication history, and the fourth communication session established with MFP 100A on the basis of the second piece of communication history, and thereby relays communications between cloud server 400 and MFP 100A. Relay portion 270 transmits data received from cloud server 400 via the third communication session established with cloud server 400 on the basis of the second piece of communication history, to MFP 100A via the fourth communication session established with MFP 100A on the basis of the second piece of communication history; relay portion 270 transmits data received from MFP 100A via the fourth communication session established with MFP 100A on the basis of the second piece of communication history, to cloud server 100 via the third communication session established with cloud server 400 on the basis of the second piece of communication history. Relay portion 270 relays communications between cloud server 400 and MFP 100 or MFP 100A, and thus, this allows data transmission/reception between cloud server 400 and MFP 100, or between cloud server 400 and MFP 100A.

Figure 14:
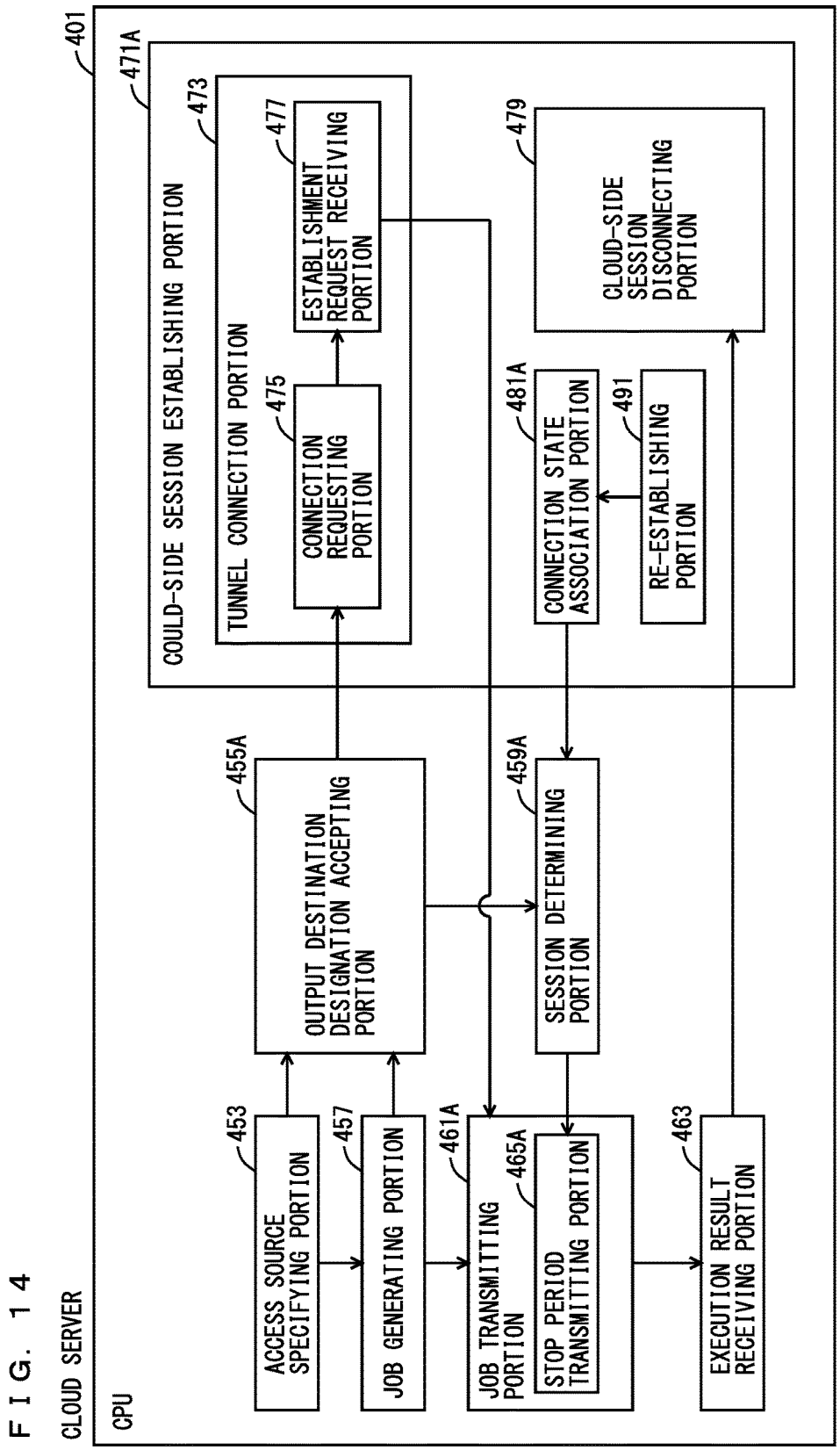
FIG. 14 is a block diagram showing, by way of example, the functions of a CPU included in the cloud server according to the modification.

FIG. 14 is a block diagram showing, by way of example, the functions of a CPU included in the cloud server according to the modification. Referring to FIG. 14, differences from the functions shown in FIG. 8 are as follows: stop period acquiring portion 451 is deleted; output destination designation accepting portion 455, job transmitting portion 461, session determining portion 459, and cloud-side session establishing portion 471 are respectively change to output destination designation accepting portion 455A, job transmitting portion 461A, session determining portion 459A, and cloud-side session establishing portion 471A; connection state association portion 481 included in cloud-side session establishing portion 471 is changed to connection state association portion 481A included in cloud-side session establishing portion 471A; and a re-establishing portion 491 is added to cloud-side session establishing portion 471A. The other functions are the same as the functions shown in FIG. 8 and therefore will not be repeated.

Output destination designation accepting portion 455A receives the access source identification information from access source specifying portion 453, receives the session identification information of the global session from cloud-side session establishing portion 471, and a pair of the access source identification information and the job ID from job generating portion 457. Output destination designation accepting portion 455A specifies the output destination in accordance with an operation received from the access source specified by the access source identification information. Output destination designation accepting portion 455A controls communication portion 305 to transmit a device selecting screen in which gateway device 200 and any one of MFPs 100, 100A, and 100B are able to be selected, to a PC as the access source specified by the access source identification information input from access source specifying portion 453. In response to an event that an operation of selecting gateway device 200 and any one of MFPs 100, 100A, and 100B is received from the PC as the access source, output destination designation accepting portion 455A specifies the selected device as the output destination.

In the case where a plurality of pieces of the access source identification information are received from access source specifying portion 453, output destination designation accepting portion 455A receives a plurality of pairs of the access source identification information and the job ID from job generating portion 457. Output destination designation accepting portion 455A specifies the output destination for each of the pairs in accordance with an operation received from the access source specified by the access source identification information included in the pair. Therefore, output destination designation accepting portion 455A specifies, for each of the job IDs each corresponding to each of the plurality of pieces of the access source identification information, the output destination corresponding to the job ID.

In response to an event that the output destination corresponding to the job ID is specified, output destination designation accepting portion 455A outputs to cloud-side session establishing portion 471 and session determining portion 459A the connection instruction including the address information of the specified output destination and the job ID. In the case where a plurality of the output destinations respectively corresponding to each of a plurality of the job IDs are specified, output destination designation accepting portion 455A outputs, for each of the plurality of the job IDs, to cloud-side session establishing portion 471 and session determining portion 459A the connection instruction including the job ID and the address information of the output destination corresponding to the job ID. It is here assumed, by way of example, that MFP 100 is selected as the output destination by access source specifying portion 453, and the address information of the output destination includes the device identification information of gateway device 200 and the device identification information of MFP 100.

Re-establishing portion 491 controls communication portion 305 to establish, in response to reception of a re-establishment request, a communication session with a device which has transmitted the re-establishment request. The re-establishment request received by re-establishing portion 491 includes the address information of the transmission destination, whereas the establishment request received by establishment request receiving portion 477 does not include the address information of the transmission destination. Further, after the address information of the connection destination and the address information of the connection source are input from connection requesting portion 475, in response to reception of the establishment request, establishment request receiving portion 477 establishes a communication session with the device which has transmitted the establishment request. In contrast, re-establishing portion 491 establishes, in response to reception of the re-establishment request, a communication session with the device which has transmitted the re-establishment request, in the case where the address information of the connection destination and the address information of the connection source are not input from connection requesting portion 475, in other words, connection requesting portion 475 does not transmit the tunnel connection request to management server 300. The re-establishment request includes the address information of the connection source included in the connection request. Here, in the case where the re-establishment request is transmitted from gateway device 200, re-establishing portion 491 establishes a communication session with gateway device 200. The communication session established here with gateway device 200 is a third communication session. Re-establishing portion 491 outputs to connection state association portion 481A a pair of the session identification information of the third communication session established with gateway device 200, and the address information of the connection source included in the re-establishment request.

In the case where a plurality of re-establishment requests are received, re-establishing portion 491 establishes, for each of the plurality of re-establishment request, the third communication session with the device which has transmitted the re-establishment request. In the case where a plurality of third communication sessions respectively corresponding to each of the plurality of re-establishment requests are established, re-establishing portion 491 outputs to connection state association portion 481A for each of the plurality of re-establishment request, a pair of the session identification information of the third communication session established for the re-establishment request, and the address information of the connection source included in the re-establishment request.

In response to an event that the pair of the session identification information of the third communication session and the address information of the connection source is input from re-establishing portion 491, connection state association portion 481A associates the session identification information of the third communication session with the address information of the connection source, and outputs to session determining portion 459A a pair of the session identification information of the third communication session and the address information of the connection source. Specifically, connection state association portion 481A stores in HDD 404 the output destination association information including the session identification information of the third communication session and the address information of the connection source. In the case where a plurality of the pairs of the session identification information of the third communication session and the address information of the connection source are input from re-establishing portion 491, connection state association portion 481A stores in HDD 404 the output destination association information corresponding to each of the plurality of the pairs.

In response to an event that the connection instruction is input from output destination designation accepting portion 455, session determining portion 459A extracts, from among one or more of pieces of output destination association information stored in HDD 404, the output destination association information in which the address information of the connection source is the same as the address information of the output destination included in the connection instruction, and session determining portion 459A outputs to job transmitting portion 461A a pair of the session identification information of the third communication session included in the extracted output destination association information, and the address information of the output destination and the job ID included in the connection instruction. In the case where a plurality of the connection instructions are input from output destination designation accepting portion 455, session determining portion 459 extracts, for each of the plurality of the connection instructions, from among the output destination association information stored in HDD 404, the output destination association information in which the address information of the connection source is the same as the address information of the output destination included in the connection instruction, and outputs to job transmitting portion 461A a pair of the session identification information of the third communication session included in the extracted output destination association information, and the address information of the output destination and the job ID included in the connection instruction.

In the case where the pair of the session identification information of the third communication session, the job ID and the address information of the output destination is not input from session determining portion 459A, as well as the pair of the session identification information of the first communication session, the job ID and the address information of the output destination is input from establishment request receiving portion 477, job transmitting portion 461A specifies, from among the pairs of the session identification information of the first communication session, the job ID and the address information of the output destination input from establishment request receiving portion 477, a pair including a job ID of the job input from job generating portion 457, and specifies the session identification information included in the specified pair. Job transmitting portion 461 controls communication portion 305 so as to transmit to gateway device 200 the job input from job generating portion 457 via the first communication session specified by the specified session identification information. In response to transmission of the job, job transmitting portion 461 outputs a pair of the job ID and the session identification information to execution result receiving portion 463.

Job transmitting portion 461A includes a stop period transmitting portion 465A. In the case where the pair of the session identification information of the third communication session, the job ID and the address information of the output destination is input from session determining portion 459A, stop period transmitting portion 465A specifies, from among the pairs of the session identification information of the third communication session, the job ID and the address information of the output destination input from session determining portion 459A, a pair including a job ID of the job input from job generating portion 457, and specifies the session identification information included in the specified pair. Stop period transmitting portion 465 controls communication portion 305 so as to transmit to gateway device 200 the job input from job generating portion 457 via the third communication session specified by the specified session identification information. In response to transmission of the job, stop period transmitting portion 465A receives an execution result via the third communication session, without outputting the pair of the job ID and the session identification information to execution result receiving portion 463.

After one or more pairs of the session identification information of the third communication session, the job ID and the address information of the output destination are input from session determining portion 459A, stop period transmitting portion 465A may receive a plurality of jobs from job generating portion 457. In the case where the plurality of jobs are input from job generating portion 457, stop period transmitting portion 465A specifies, for each of the job, the session identification information of the third communication session. Stop period transmitting portion 465A associates the session identification information with each of the plurality of jobs. Then, in the case where there exists a plurality of the jobs which are associated with the same session identification information, stop period transmitting portion 465A controls communication portion 405 so as to transmit the plurality of the jobs in sequence via the third communication session specified by the session identification information associated with each of the plurality of the jobs. There only exits one of the third communication session established with a device specified by the device identification information of the output destination accepted accepted by output destination designation accepting portion 455. Therefore, in order for the plurality of jobs to be transmitted via the single communication session, the plurality of jobs are not transmitted in parallel, but in sequential.

The job transmitted by stop period transmitting portion 465A to gateway device 200 via the third communication session is received by gateway device 200 via the third communication session, and transmitted to MFP 100 via the fourth communication session. MFP 100 executes the job received from gateway device 200, and transmits the execution result to gateway device 200. Gateway device 200 transmits to cloud server 400 the execution result received from MFP 100 via the fourth communication session.

Figure 15:
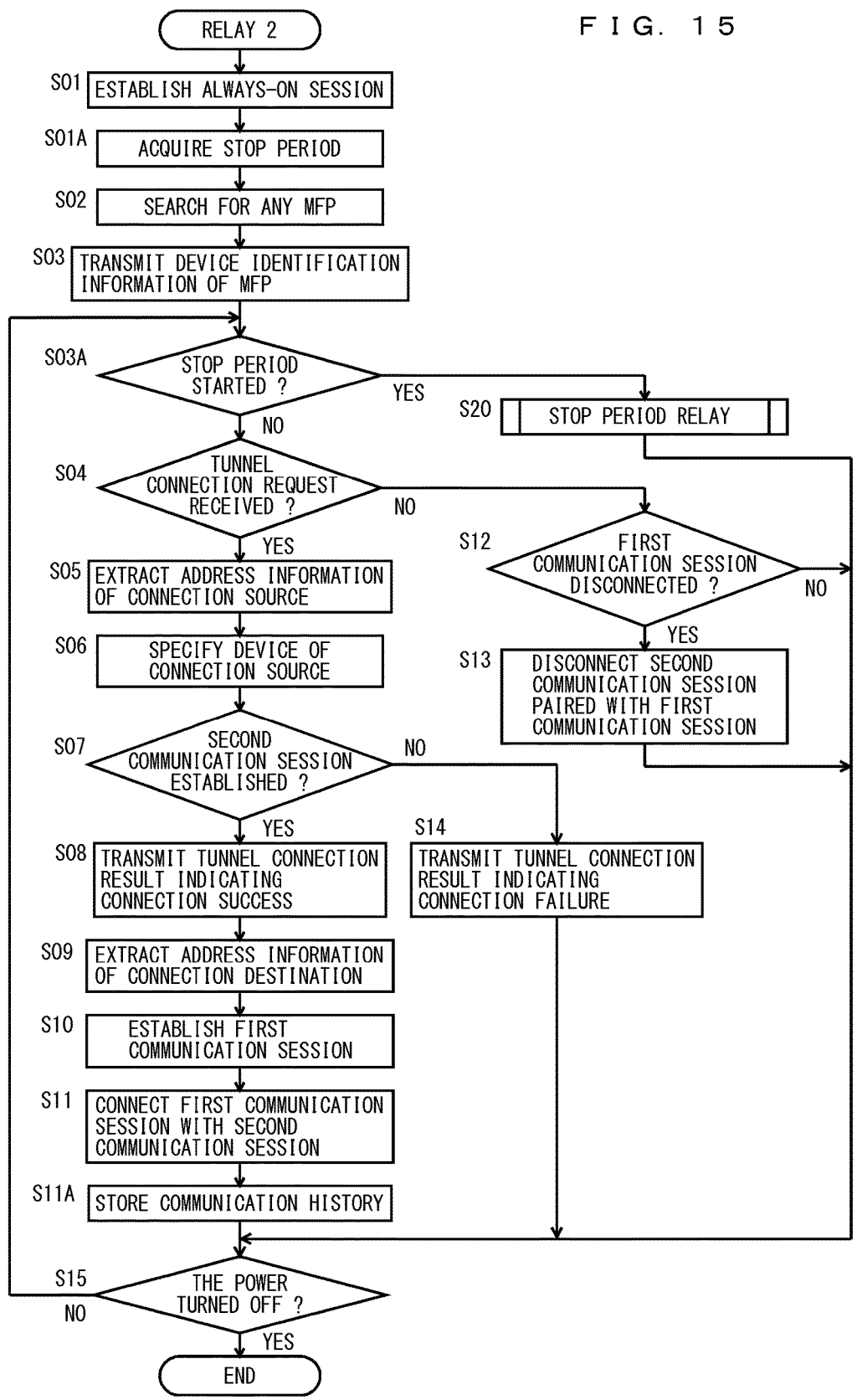
FIG. 15 is a flowchart illustrating an exemplary flow of a relay process according to the modification.

FIG. 15 is a flowchart illustrating an exemplary flow of a relay process according to the modification. The relay process according to the modification is performed by CPU 201 included in gateway device 200 as CPU 201 executes a relay program stored in ROM 202, flash memory 204, or CD-ROM 209A according to the modification. Referring to FIG. 15, differences from the relay process shown in FIG. 9 are as follows: step S01A is added between step S01 and step S02; step S03A is added between step S03 and step S04; step S11A is added between step S11 and step S15; and step S20 is added. The other steps are the same as the steps shown in FIG. 9 and therefore will not be repeated.

Referring to FIG. 15, CPU 201 acquires the stop period in step S01A. In response to an event that first communication portion 205 receives the stop period from management server 300, CPU 201 acquires the stop period. In step S03A, CPU 201 determines whether the stop period has started. If the present time and date is included in the stop period acquired in step S01A, CPU 201 determines that the stop period has started. If the stop period has started, the process proceeds to step S20; otherwise, the process proceeds to step S04.

In step S20, CPU 201 executes a stop period relay process, and the process proceeds to step S15. In step S11A, CPU 201 stores the communication history. The communication history includes the address information of the connection destination and the address information of the connection source included in the connection request included in the tunnel connection request received in step S04. In the case where the communication history including the same address information of the connection source and the same address information of the connection destination as those included in the connection request is already stored, CPU 201 does not store the communication history, and the process proceeds to step S15.

Figure 16:
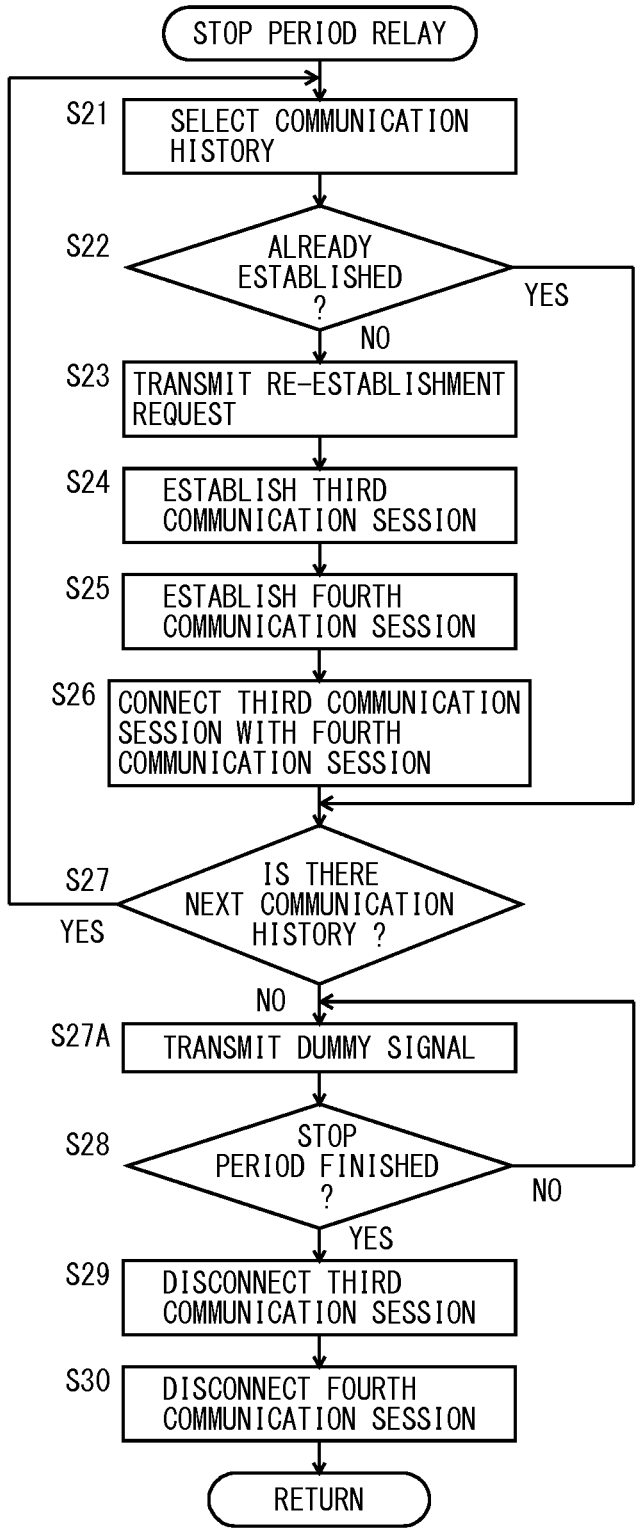
FIG. 16 is a flowchart illustrating an exemplary flow of a stop period relay process.

FIG. 16 is a flowchart illustrating an exemplary flow of a stop period relay process. The stop period relay process is a process executed in step S20 shown in FIG. 15. At a stage before the stop period relay process is executed in step S20, the communication history is stored in flash memory 204. Referring to FIG. 16, CPU 201 selects as a process target a piece of the communication history from among the communication history stored in flash memory 204 (step S21). Then, CPU 201 determines, on the basis of the selected piece of the communication history, whether the third communication session and the fourth communication session are established (step S22). Specifically, CPU 201 determines whether the third communication session is established, in step S24 as described below, by using the same address information as the address information of the connection destination included in the selected piece of the communication history, as well as whether the fourth communication session is established, in step S25 as described below, by using the same address information of the connection destination included in the selected piece of the communication history. If such third and fourth communication sessions are established, the process proceeds to step S27; otherwise, the process proceeds to step S23.

In step S23, CPU 201 transmits the re-establishment request on the basis of the address information of the connection destination included in the communication history. If the address information of the connection destination is the address information of cloud server 400, CPU 201 determines the network address of cloud server 400 from the address information of cloud server 400, and controls first communication portion 205 so as to transmit the re-establishment request to cloud server 400. The re-establishment request includes the address information of the connection source included in the piece of the communication history selected in step S21.

In the following step S24, CPU 201 establishes the third communication session with a device which has transmitted the re-establishment request, which will be cloud server 400 here, and the process proceeds to step S25. In step S25, CPU 201 transmits the establishment request on the basis of the address information of the connection source included in the communication history, and establishes the fourth communication session with a device which has transmitted the establishment request. If the address information of the connection source is the address information of MFP 100, CPU 201 controls second communication portion 206 so as to establish the fourth communication session with MFP 100. Further, if the address information of the connection source is the address information of MFP 100A, CPU 201 controls second communication portion 206 so as to establish the fourth communication session with MFP 100A.

In step S26, CPU 201 connects the third communication session with the fourth communication session. Specifically, CPU 201 uses the third communication session and the fourth communication session so as to relay communications between a device specified by the address information of the connection source and a device specified by the address information of the connection destination. For example, in the case where the third communication session established in step S24 is established with cloud server 400, as well as the fourth communication session established in step S25 is established with MFP 100, CPU 201 receives data from cloud server 400 via the third communication session and transmits the received data to MFP 100 on behalf of cloud server 400 via the fourth communication session. Further, in the case where the execution result is received from MFP 100 via the fourth communication session, CPU 201 transmits the execution result to cloud server 400 on behalf of MFP 100 via the third communication session. The execution result includes the network address of MFP 100. Further, in the case where the third communication session established in step S24 is established with cloud server 400, as well as the fourth communication session established in step S25 is established with MFP 100A, CPU 201 receives data from cloud server 400 via the third communication session and transmits the received data to MFP 100A on behalf of cloud server 400 via the fourth communication session. Further, in the case where the execution result is received from MFP 100A via the fourth communication session, CPU 201 transmits the execution result to cloud server 400 on behalf of MFP 100A via the third communication session. The execution result includes the network address of MFP 100A.

In step S27, CPU 201 determines where there exists a piece of the communication history which is not selected as process target, among the communication history stored in flash memory 204. If there exists a not-yet-processed piece of the communication history, the process returns to step S21; otherwise, the process proceeds to step S27A. In step S27A, CPU 201 transmits the dummy signal, and the process proceeds to step S28. CPU 201 transmits the dummy signal via the third communication session established in step S24 and the fourth communication session established in step S25. This prevents the third communication session and the fourth communication session from being disconnected depending on a device of the other side of each of the third communication session and the fourth communication session. In the case where a plurality of the third communication sessions are established, CPU 201 transmits the dummy signal to all of the plurality of the third communication sessions, and in the case where a plurality of the fourth communication sessions are established, CPU 201 transmits the dummy signal to all of the plurality of the fourth communication sessions.

In step S28, CPU 201 determines whether the stop period has finished. If the stop period has finished, the process proceeds to step S29; otherwise, the process returns to step S27A. In step S29, CPU 201 disconnects the third communication session established in step S24. If a plurality of the third communication sessions are established, CPU 201 disconnects all of the plurality of the third communication sessions. In step S30, CPU 201 disconnects the fourth communication session established in step S25, and the process returns to the relay process. If a plurality of the fourth communication sessions are established, CPU 201 disconnects all of the plurality of the fourth communication sessions.

Figure 17:
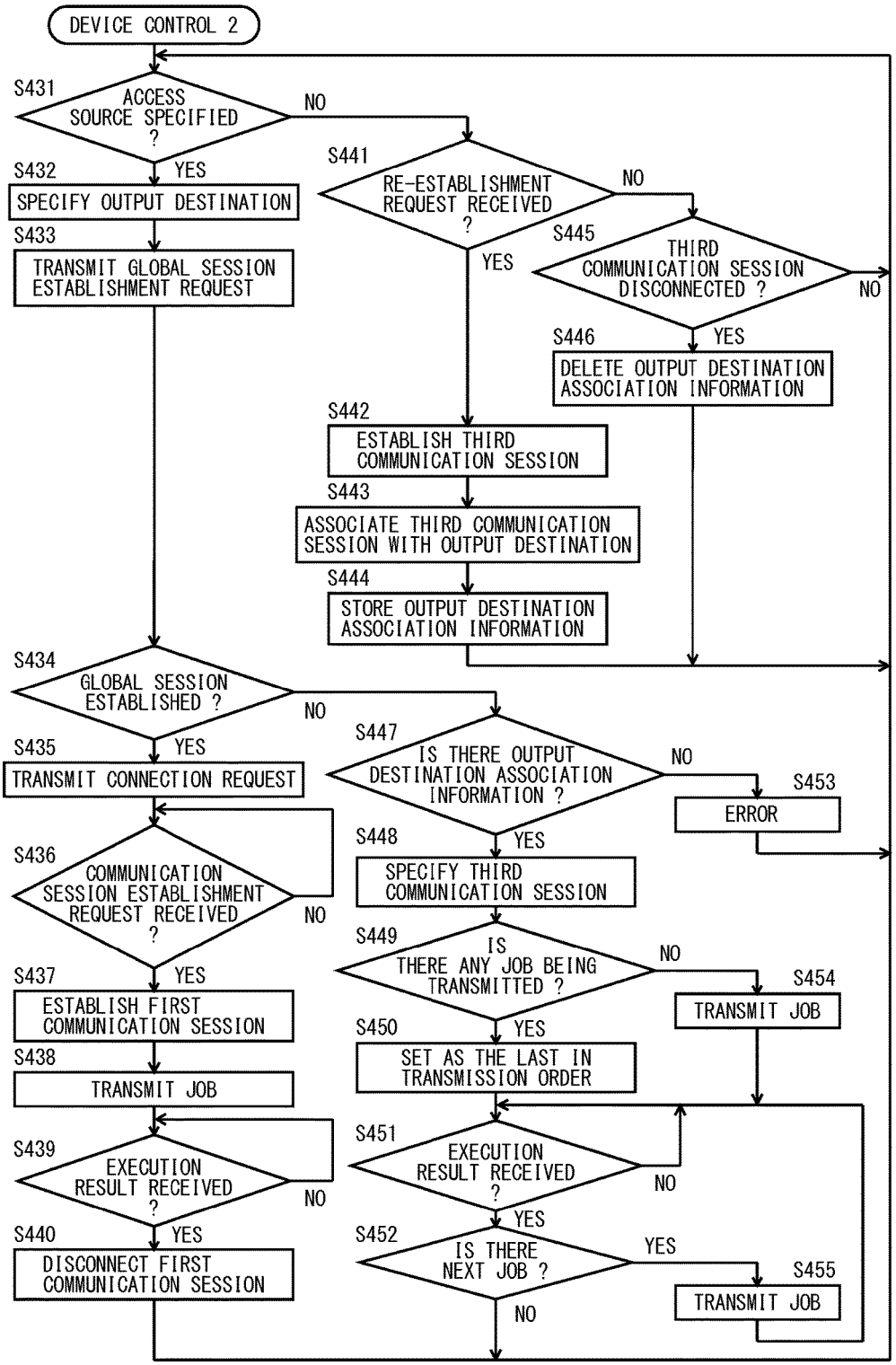
FIG. 17 is a flowchart illustrating an exemplary flow of a device control process according to the modification.

FIG. 17 is a flowchart illustrating an exemplary flow of a device control process according to the modification. The device control process shown in FIG. 17 is a process executed by CPU 401 in the case where one access source exists. If there exist a plurality of access sources, CPU 401 executes, for each of the access sources, the control target process shown in FIG. 17. Referring to FIG. 17, CPU 401 determines whether the access source is specified (step S431). If the access source is specified (YES in step S431), the process proceeds to step S432; otherwise, the process proceeds to step S441. In the following step S432, CPU 401 specifies the output destination, and specifies as the output destination a device specified by the user who is operating a PC of the access source. It is here assumed, by way of example, that MFP 100 is specified as the output destination.

Then, CPU 401 controls communication portion 305 so as to transmit to management server 300 the establishment request for establishing a global session with management server which manages a device specified as the output destination in step S432 (step S433). The device which manages the device specified as the output destination is a device which has transmitted the device identification information of the device specified as the output destination, which will be management server 300 here. In the following step S434, CPU 401 determines whether the global session is established as a communication session with management server 300. If the global session is established, the process proceeds to step S435; otherwise, the process proceeds to step S447. A case where the global session is unable to be established is, for example, the stop period during which management server 300 refrains from providing a service.

In the following step S435, CPU 401 transmits the connection request to management server 300 via the global session established in step S433. It is here assumed, by way of example, that the connection request includes the address information of MFP 100 as the address information of the connection source, and the address information of cloud server 400 as the address information of the connection destination. The address information of cloud server 400 is a URL which includes a network address (domain name) of cloud server 400, a Web page identifier, an identifier (job ID) of the job executed by cloud server 400, and a listening port number.

In the following step S436, CPU 401 determines whether the establishment request of a communication session is received. The establishment request here corresponds to the connection request transmitted to management server 300 in step S435. The connection request transmitted to management server 300 in step S435 includes the address information of cloud server 400 as the address information of the connection destination. Here, since the address information of cloud server 400 is a URL, the establishment request is for accessing the URL. Therefore, in step S436, CPU 401 receives the establishment request from gateway device 200, as the establishment request corresponding to the connection request transmitted to management server 300 in step S435. CPU 401 is in a standby state until the establishment request of the communication session is received (NO in step S436); if the establishment request of the communication session is received (YES in step S436), the process proceeds to step S437.

In step S437, CPU 401 establishes the first communication session corresponding to the establishment request of the communication session, and the process proceeds to step S438. The first communication session is established with a device which has transmitted the the establishment request of the communication session, here, gateway device 200.

In step S438, CPU 401 transmits a job via the first communication session. The transmission destination is gateway device 200, the job transmitted via the first communication session as described above is transmitted by gateway device 200 to MFP 100 via the second communication session established between gateway device 200 and MFP 100. Therefore, the job is actually transmitted to MFP 100.

In the following step S439, CPU 401 determines whether the execution result is received via the first communication session. CPU 401 is in a standby state until the execution result is received (NO in step S439); if the execution result is received (YES in step S439), the process proceeds to step S440. In step S440, CPU 401 disconnects the first communication session established in step S437, and the process returns to step S431.

In step S441, CPU 401 determines whether communication portion 405 receives re-establishment from gateway device 200. If the re-establishment request is received, the process proceeds to step S442; otherwise, the process proceeds to step S445. In step S442, CPU 401 establishes the third communication session with gateway device 200 which has transmitted the re-establishment request, and then associates the third communication session with the output destination (step S443). The output destination is a device specified by the address information of the connection source included in the re-establishment request. Specifically, CPU 401 generates the output destination association information including the session identification information of the third communication session and the address information of the connection source. Then, CPU 401 stores the output destination association information in HDD 404 (step S444), and the process returns to step S431.

In step S445, CPU 401 determines whether the third communication session established in step S442 is disconnected. There may be the case where gateway device 200 disconnects the third communication session. If the third communication session is disconnected, the process proceeds to step S446; otherwise, the process returns to step S431. In step S446, CPU 401 deletes from HDD 404 the output destination association information including the session identification information of the disconnected third communication session among the output destination association information stored in HDD 400, and the process returns to step S431.

The case where the process proceeds to step S447 is the case where the global session is unable to be established with management server 300 in step S434. In other words, the present time and date is included in the stop period during which management server 300 refrains from providing a service. In step S447, CPU 401 determines whether there exists the output destination association information corresponding to the output destination specified in step S432. CPU 401 extracts, from among the output destination association information stored in HDD 404, the output destination association information including the same address information as the address information of a device of the output destination specified in step S432. If such output destination association information is extracted, the process proceeds to step S453. In step S453, the process returns to step S431, as an error process. For example, a message which notifies that a connection to the output destination as the specified device is not available is transmitted to the access source in step S431.

In step S448, CPU 401 specifies the third communication session, which is identified by the session identification information included in the output destination association information extracted in step S447. Then, CPU 401 determines whether there exists a job being in transmission via the third communication session specified in step S448 (step S449). If there exists the job being in transmission, the process proceeds to step S450; otherwise, the process proceeds to step S454. There may be the case where a job is transmitted via the same third communication session if the device control process is executed on another access source. In step S450, CPU 401 sets as the last the order of transmitting a job targeted to be processed, and the process proceeds to step S451. In step S454, CPU 401 transmits the job targeted to be processes via the third communication session specified in step S448, and the process proceeds to step S451.

In step S451, CPU 401 determines whether the execution result is received via the third communication session specified in step S448. CPU 401 is in a standby state until the execution result is received (NO in step S451); if the execution is received (YES in step S451), the process proceeds to step S452.

In step S452, CPU 401 determines whether there exists a not-yet-transmitted job among jobs to which the order of transmission is assigned in step S449. If there exists a not-yet-transmitted job, the process proceeds to step S455; otherwise, the process returns to step S431. In step S455, CPU 401 transmits a job in the earliest of the order of transmission, via the third communication session specified in step S448, and the process returns to step S451.

As described above, gateway device 200 according to the modification is capable of: acquiring the stop period indicating a period during which management server 300 refrains from providing a service; establishing the first communication session with cloud server 400 in response to reception of the connection request from management server 300; storing the communication history including the address information of the connection source and the address information of the connection destination included in the connection request; in response to an event that the stop period has started, transmitting re-establishment request including the address information of the connection source included in the communication history; establishing the third communication session with cloud server 400; in response to an event that the stop period has started, establishing the fourth communication session with a device, for example, MFP 100, specified by the address information of the connection source included in the communication history, among MFPs 100, 100A, and 100B; and during the time that the third communication session is established, using the third communication session and the fourth communication session to relay communications between cloud server 400 and MFP 100. On the other hand, cloud server 300 is capable of: establishing, in response to an event that the re-establishment request is received from gateway device 200, the third communication session with gateway device 200; and in the case where the third communication session is established, transmitting the job to MFP 100 via the third communication session. Therefore, it is possible to transmit the job, during the time that management server refrains from providing a service, from cloud server 400 outside the firewall to MFPs 100, 100A, and 100B inside the firewall.

Further, cloud server 400 according to the modification is capable of, in the case where a plurality of users are specified during the time that the third communication session is established, transmitting in sequence a plurality of jobs on the basis of each of the operations by the plurality of users to a device designated by user, for example, MFP 100, from among MFPs 100, 100A, and 100B. This allows transmission of the plurality of jobs to MFP 100.

Further, gateway device 200 according to the modification is capable of: in response to an event that the third communication session is established, storing in HDD 404 the output destination association information which associates the session identification information of the third communication session with the address information of a device designated by the user, for example, MFP 100, from among MFPs 100, 100A, and 100B; and in the case where the user of the access source is specified during the time that the third communication session is established, transmitting the job on the basis of the user's operation on the condition that there exists the session identification information associated with the address information of MFP 100 designated by the specified user, via the third communication session specified by the session identification information. This allows transmitting a job to the device selected by the user from among MFPs 100, 100A, and 100B.

Further, gateway device 200 according to the modification stores in HDD 404 the communication history including the address information of the connection source and the address information of the connection destination included in the connection request, and in the case where there exist a plurality of pieces of the communication history including the same address information of the connection source and the connection destination, gateway device 200 transmits one re-establishment request for the plurality of pieces of the communication history. Therefore, since one of the third communication sessions is established between a device specified by the address information of one connection source, for example, MFP 100, and cloud server specified by the address information of one connection destination, it is possible to connect cloud server 400 with each of MFPs 100, 100A, and 100B by the single third communication session. This allows network resources to be used effectively.

In the foregoing embodiments, information processing system 1 has been described by way of example. However, it is needless to say that the present invention can be understood as a device control method for causing gateway device 200 to execute the relay process shown in FIG. 9, causing management server 300 to execute the tunnel connection support process shown FIG. 10, and causing cloud server 400 to execute the device control process shown in FIG. 11, or as a device control program for causing CPU 401 controlling cloud server 400 to execute the device control method shown in FIG. 11. Further, it is needless to say that the present invention can be understood as a device control method for causing gateway device 200 to execute the relay process shown in FIG. 15, causing management server 300 to execute the tunnel connection support process shown in FIG. 16, and causing cloud server 400 to execute the device control process shown in FIG. 17, or as a device control program for causing CPU 201 controlling gateway device 200 to execute the relay process shown FIGS. 15 and 16, and as a device control program for causing CPU 401 controlling cloud server 400 to execute the device control process shown in FIG. 17.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing system comprising:
a cloud server and a management server disposed outside a firewall; and
a relay device disposed inside the firewall and connected to a control target device disposed inside the firewall, the cloud server including a first controller CPU and a first communication portion, wherein
said first controller CPU includes functions comprising:
a stop period acquiring portion configured to cause said first communication portion to acquire a stop period indicating a period during which said management server refrains from providing a service;
a cloud-side session establishing portion configured to cause said first communication portion to establish a first communication session with said relay device;
a job generating portion configured to generate a job to be executed by said control target device; and
a job transmitting portion configured to cause said first communication portion to transmit said generated job to said control target device via said first communication session,
said cloud-side session establishing portion including,
a connection requesting portion configured to, in the case of not being in said stop period, transmit to said management server a connection request including address information of a connection destination and address information of a connection source for identifying said control target device,
an establishment request receiving portion configured to, after said connection request has been transmitted, establish said first communication session in the case where an establishment request is received from said relay device receiving said connection request forwarded from said management server, the establishment request including the same address information as said address information of the connection destination included in said connection request,
a cloud-side session disconnecting portion configured to, after said first communication session has been established, in response to acquisition of a result of a job executed by said control target device, disconnect said first communication session on the condition of not being in said stop period, and in the case of being in said stop period, disconnect said first communication session after said stop period has finished, and
said job transmitting portion being configured to, in the case where said job is generated in said stop period, transmit the job generated in said stop period to said control target device, via said first communication session established before said stop period starts.

2. The information processing system according to claim 1, wherein:
said management server includes a second controller CPU and a second communication portion;
said second controller CPU including functions comprising:
a server-side session establishing portion configured to, based on a request from said relay device, cause said second communication portion to establish an always-on session with said relay device,
a tunnel connection requesting portion configured to, in response to an event that said second communication portion receives said connection request from said cloud server, cause said second communication portion to transmit said connection request to said relay device via said always-on session; and
said relay device includes a third controller CPU, a third communication portion, and a fourth communication portion,
said third controller CPU including functions comprising:
an always-on session establishing portion configured to cause said third communication portion to establish said always-on session with said management server, a first session establishing portion configured to, in response to an event that said third communication portion receives said connection request from said management server via said always-on session, cause said third communication portion to establish said first communication session with said cloud server by using said address information of the connection destination included in said connection request, a second session establishing portion configured to cause said fourth communication portion to establish a second communication session with said control target device specified by said address information of the connection source included in said connection request received from said management server, and a relay portion configured to, by using said first communication session and said second communication session, relay communications between said cloud server and said control target device.

3. The information processing system according to claim 1, wherein said job transmitting portion includes a sequential transmitting portion configured to, in the case where a plurality of said jobs are generated in said stop period, sequentially transmit to said control target device said plurality of the jobs generated in said stop period, via said first communication session.

4. The information processing system according to claim 1, wherein:

there are a plurality of said control target devices;

said connection requesting portion is configured to, in the case of not being in said stop period, transmit to said management server a connection request including address information being for identifying a control target device to execute said job, among said plurality of the control target devices, as address information of a connection source;

said cloud-side session establishing portion further includes a connection state association portion configured to, during the time that said first communication session is established, associate session identification information for identifying said first communication session with said address information of the connection source; and said job transmitting portion is configured to, on the condition that there exists session identification information associated by said connection state association portion with the same address information of the connection source as the address information of the control target device designated as a device to execute a job generated in said stop period, transmit the job generated in said stop period, via said first communication session specified by the session identification information.

5. The information processing system according to claim 4, wherein said first controller CPU included in said cloud server further includes a function comprising a disconnecting portion configured to, in the case where a plurality of pieces of session identification information are associated with a piece of device identification information by said connection state association portion, cause said first communication portion to disconnect a first communication session specified by session identification information other than a piece of session identification information selected from among said plurality of pieces of session identification information.

6. An information processing system comprising:

a cloud server and a management server disposed outside a firewall; and a relay device disposed inside the firewall and connected to a control target device disposed inside the firewall, the relay device including a first controller CPU, a first communication portion, and a second communication portion, wherein said first controller CPU includes functions comprising:

an always-on session establishing portion configured to cause said first communication portion to establish an always-on session with said management server;

a stop period acquiring portion configured to cause said first communication portion to acquire stop period indicating a period during which said management server refrains from providing a service;

a first session establishing portion configured to, in response to an event that said first communication portion receives from said management server via said always-on session a connection request including address information of a connection source and address information of a connection destination, the connection request being received by said management server from said cloud server, cause said first communication portion to establish a first communication session with said cloud server by using said address information of the connection destination included in said received connection request;

a communication history storing portion configured to, in response to said first communication session being established, store in a storing portion a communication history including the address information of the connection source and the address information of the connection destination included in said received connection request;

a second session establishing portion configured to cause said second communication portion to establish a second communication session with said control target device specified by said address information of the connection source included in said received connection request;

a relay portion configured to, by using said first communication session and said second communication session, relay communications between said cloud server and said control target device;

a third session establishing portion configured to,
in response to an event that said stop period starts, cause said first communication portion to transmit to said cloud server specified by said address information of the connection destination included in the communication history a re-establishment request including said address information of the connection source included in the communication history,
cause said first communication portion to establish a third communication session with said cloud server, and
maintain said third communication session until said stop period finishes; and a fourth session establishing portion configured to, in response to an event that said stop period starts, cause said second communication portion to establish a fourth communication session with said control target device specified by said address information of the connection source included in the communication history, said relay portion being configured to, during the time that said third communication session is established by said third session establishing portion, relay communications between said cloud server and said control target device by using said third communication session and said fourth communication session, said cloud server includes a second controller CPU, and a third communication portion, wherein said second controller CPU includes functions comprising:

a cloud-side session establishing portion configured to cause said third communication portion to establish a first communication session with said relay device;

a job generating portion configured to generate a job to be executed by said control target device; and a job transmitting portion configured to cause said third communication portion to transmit said generated job to said control target device via said first communication session, said cloud-side session establishing portion including, a connection requesting portion configured to cause said third communication portion to transmit to said management server a connection request including address information of a connection destination and address information of a connection source for identifying said control target device, an establishment request receiving portion configured to, after said connection request has been transmitted, cause said third communication portion to establish said first communication session in the case where said third communication portion receives an establishment request including the same address information as said address information of the connection destination included in said connection request from said relay device receiving said connection request forwarded from said management server, a cloud-side session disconnecting portion configured to, after said first communication session is established, in response to acquisition of a result of a job executed by said control target device, cause said third communication portion to disconnect said first communication session, a re-establishing portion configured to, in response to an event that said third communication portion receives said re-establishment request from said relay device, cause said third communication portion to establish said third communication session with said relay device, and said job transmitting portion including a stop period transmitting portion configured to, in the case where said third communication session is established, cause said third communication portion to transmit said generated job to said control target device via said third communication session.

7. The information processing system according to claim 6, wherein said stop period transmitting portion is configured to, in the case where a plurality of said jobs are generated during the time that said third communication session is established, sequentially transmit to said control target device said plurality of the jobs generated in said stop period via said third communication session.

8. The information processing system according to claim 6, wherein:

there are a plurality of said control target devices;

said second controller CPU included in said cloud server further includes a function comprising a connection state association portion configured to, in response to an event that said third communication session is established with said relay device, associate session identification information for identifying said third communication session with address information of a connection source included in said re-establishment request received from said relay device; and said job transmitting portion is configured to, in the case where said job is generated during the time that said third communication session is established, on the condition that there exists session identification information associated by said connection state association portion with the same address information of the connection source as the address information of a control target device to execute said generated job among said plurality of the control target devices, cause said third communication portion to transmit said generated job via said third communication session specified by the session identification information.

9. The information processing system according to claim 6, wherein said third session establishing portion is configured to cause said first communication portion to transmit one re-establishment request for a plurality of pieces of communication history in which address information of a connection source and address information of a connection destination are the same.

10. A cloud server disposed outside a firewall, comprising a controller CPU and a communication portion, wherein said controller CPU includes functions comprising:

a stop period acquiring portion configured to cause said communication portion to acquire a stop period indicating a period during which a management server disposed outside the firewall refrains from providing a service;

a cloud-side session establishing portion configured to cause said communication portion to establish a first communication session with a relay device disposed inside the firewall and connected to a control target device disposed inside the firewall;

a job generating portion configured to generate a job to be executed by said control target device; and a job transmitting portion configured to cause said communication portion to transmit said generated job to said control target device via said first communication session, said cloud-side session establishing portion including, a connection requesting portion configured to, in the case of not being in said stop period, cause said communication portion to transmit to said management server a connection request including address information of a connection destination and address information of a connection source for identifying said control target device, an establishment request receiving portion configured to, after said connection request has been transmitted, cause said communication portion to establish said first communication session in the case where an establishment request is received from said relay device receiving said connection request forwarded from said management server, the establishment request including the same address information as said address information of the connection destination included in said connection request, a cloud-side session disconnecting portion configured to, after said first communication session has been established, in response to acquisition of a result of a job executed by said control target device, cause said communication portion to disconnect said first communication session on the condition of not being in said stop period, and in the case of being in said stop period, cause said communication portion to disconnect said first communication session after said stop period has finished, and said job transmitting portion being configured to, in the case where said job is generated in said stop period, cause said communication portion to transmit to said control target device the job generated in said stop period, via said first communication session established before said stop period starts.

11. The cloud server according to claim 10, wherein said job transmitting portion includes a sequential transmitting portion configured to, in the case where a plurality of said jobs are generated in said stop period, cause said communication portion to sequentially transmit to said control target device said plurality of the jobs generated in said stop period via said first communication session.

12. The cloud server according to claim 10, wherein there are a plurality of said control target devices;

said connection requesting portion is configured to, in the case of not being in said stop period, cause said communication portion to transmit to said management server a connection request including address information being for identifying a control target device to execute said job, among said plurality of the control target devices, as address information of a connection source;

said cloud-side session establishing portion further includes a connection state association portion configured to, during the time that said first communication session is established, associate session identification information for identifying said first communication session with said address information of the connection source; and said job transmitting portion is configured to, on the condition that there exists session identification information associated by said connection state association portion with the same address information of the connection source as the address information of the control target device designated as a device to execute a job generated in said stop period, cause said communication portion to transmit the job generated in said stop period via said first communication session specified by the session identification information.

13. The cloud server according to claim 12, wherein said controller CPU further includes a function comprising a disconnecting portion configured to, in the case where a plurality of pieces of session identification information are associated with a piece of device identification information by said connection state association portion, cause said communication portion to disconnect a first communication session specified by session identification information other than a piece of session identification information selected from among said plurality of pieces of session identification information.

14. A device control method performed in an information processing system including a cloud server and a management server disposed outside a firewall and a relay device disposed inside the firewall and connected to a control target device disposed inside the firewall, allowing said relay device to execute:

an always-on session establishing step of establishing an always-on session with said management server;

a stop period acquiring step of acquiring stop period indicating a period during which said management server refrains from providing a service;

a first session establishing step of, in response to an event that a connection request including address information of a connection source and address information of a connection destination is received from said management server via said always-on session, the connection request being received by said management server from said cloud server, establishing a first communication session with said cloud server by using said address information of the connection destination included in said received connection request;

a communication history storing step of, in response to said first communication session being established, storing a communication history including the address information of the connection source and the address information of the connection destination included in said connection request;

a second session establishing step of establishing a second communication session with said control target device specified by said address information of the connection source included in said received connection request;

a relay step of, by using said first communication session and said second communication session, relaying communications between said cloud server and said control target device;

a third session establishing step of,
in response to an event that said stop period starts, transmitting to said cloud server specified by said address information of the connection destination included in the communication history a re-establishment request including said address information of the connection source included in the communication history,
establishing a third communication session with said cloud server, and
maintaining said third communication session until said stop period finishes; and a fourth session establishing step of, in response to an event that said stop period starts, establishing a fourth communication session with said control target device specified by said address information of the connection source included in the communication history, wherein
said relay step includes a step of, during the time that said third communication session is established by said third session establishing portion, relaying communications between said cloud server and said control target device by using said third communication session and said fourth communication session, the device control method further allowing said cloud server to execute,
a cloud-side session establishing step of establishing a first communication session with said relay device,
a job generating step of generating a job to be executed by said control target device, and a job transmitting step of transmitting said generated job to said control target device via said first communication session, said cloud-side session establishing step includes, a connection requesting step of transmitting to said management server a connection request including address information of a connection destination and address information of a connection source for identifying said control target device, an establishment request receiving step of, after said connection request has been transmitted, establishing said first communication session in the case where an establishment request including the same address information as said address information of the connection destination included in said connection request is received from said relay device receiving said connection request forwarded from said management server, a cloud-side disconnecting step of, after said first communication session is established, in response to acquisition of a result of a job executed by said control target device, disconnecting said first communication session, and a re-establishing step of, in response to an event that said re-establishment request is received from said relay device, establishing said third communication session with said relay device, said job transmitting step includes a stop period transmitting step of, in the case where said third communication session is established, transmitting said generated job to said control target device via said third communication session.

15. A device control method performed by a cloud server disposed outside a firewall, comprising:

a stop period acquiring step of acquiring stop period indicating a period during which a management server disposed outside the firewall refrains from providing a service;

a cloud-side session establishing step of establishing a first communication session with a relay device disposed inside the firewall and connected to a control target device disposed inside the firewall;

a job generating step of generating a job to be executed by said control target device; and a job transmitting step of transmitting said generated job to said control target device via said first communication session, wherein said cloud-side session establishing step includes a connection requesting step of, in the case of not being in said stop period, transmitting to said management server a connection request including address information of a connection destination and address information of a connection source for identifying said control target device, an establishment request receiving step of, after said connection request has been transmitted, establishing said first communication session in the case where an establishment request including the same address information as said address information of the connection destination included in said connection request is received from said relay device receiving said connection request forwarded from said management server, a cloud-side disconnecting step of, after said first communication session has been established, in response to acquisition of a result of a job executed by said control target device, disconnecting said first communication session on the condition of not being in said stop period, and in the case of being in said stop period, disconnecting said first communication session after said stop period has finished, and said job transmitting step includes a step of, in the case where said job is generated in said stop period, transmitting the job generated in said stop period to said control target device, via said first communication session established before said stop period starts.

16. A non-transitory computer-readable recording medium encoded with a device control program executed by a computer controlling said cloud server, wherein the device control program allows the computer to execute the device control method according to claim 15.

17. The non-transitory computer-readable recording medium encoded with a device control program according to claim 16, wherein said job transmitting step includes a sequential transmitting step of, in the case where a plurality of said jobs are generated in said stop period, sequentially transmitting to said control target device said plurality of the jobs generated in said stop period, via said first communication session.

18. The non-transitory computer-readable recording medium encoded with a device control program according to claim 16, wherein:

there are a plurality of said control target devices;

said connection requesting step includes a step of, in the case of not being in said stop period, transmitting to said management server a connection request including address information being for identifying a control target device to execute said job, among said plurality of the control target devices, as address information of a connection source;

said cloud-side session establishing step further includes a connection state association step of, during the time that said first communication session is established, associating session identification information for identifying said first communication session with said address information of the connection source; and said job transmitting step includes a step of, on the condition that there exists session identification information associated in said connection state association step with the same address information of the connection source as the address information of the control target device designated as a device to execute a job generated in said stop period, transmitting the job generated in said stop period, via said first communication session specified by the session identification information.

19. The non-transitory computer-readable recording medium encoded with a device control program according to claim 18, the device control program further allowing said computer to execute a disconnecting step of, in the case where a plurality of pieces of session identification information are associated with a piece of device identification information in said connection state association step, disconnecting a first communication session specified by session identification information other than a piece of session identification information selected from among said plurality of pieces of session identification information.

* * * * *